US012159510B2

(12) United States Patent
Mayo et al.

(10) Patent No.: US 12,159,510 B2
(45) **Date of Patent: *Dec. 3, 2024**

(54) GAMING DEVICE AND METHOD FOR OPERATING A GAMING DEVICE

(71) Applicant: Aristocrat Technologies Australia Pty Limited, North Ryde (AU)

(72) Inventors: Marc Mayo, Bass Hill (AU); Claire Mileto, Ropes Crossing (AU); Lauren Chapple, Huntleys Cove (AU); Geoffrey Richardson, Baulkham Hills (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 55 days.

This patent is subject to a terminal disclaimer.

(21) Appl. No.: 18/164,508

(22) Filed: Feb. 3, 2023

(65) Prior Publication Data

US 2023/0186724 A1 Jun. 15, 2023

Related U.S. Application Data

(63) Continuation of application No. 17/247,477, filed on Dec. 11, 2020, now Pat. No. 11,574,523, which is a (Continued)

(30) Foreign Application Priority Data

Aug. 13, 2018 (AU) ................................ 2018902952
Feb. 13, 2019 (AU) ................................ 2019200985

(51) Int. Cl.
*G07F 17/32* (2006.01)

(52) U.S. Cl.
CPC ...... *G07F 17/3244* (2013.01); *G07F 17/3211* (2013.01)

(58) Field of Classification Search
None
See application file for complete search history.

(56) References Cited

U.S. PATENT DOCUMENTS 5,885,158 A 3/1999 Torango
D621,849 S 8/2010 Anzures
(Continued)

OTHER PUBLICATIONS

Screenshots of video, 4 pgs., 2019. <https://www.aristocrat.com/anz/games/players-choice-pearl-edition>.
(Continued)

*Primary Examiner* — Ronald Laneau
(74) *Attorney, Agent, or Firm* — Weaver Austin Villeneuve & Sampson LLP

(57) ABSTRACT

Gaming devices, and methods for operating them, are provided that may display an attract mode display that includes one or more bonus markers and a plurality of denomination markers. One of the denomination markers may be highlighted, and a bonus prize associated with a bonus marker and the currently highlighted denomination marker may be determined and displayed in a region of the display associated with that bonus marker. The display may be controlled to display a denomination transition in which the highlighted denomination marker reverts to a non-highlighted representation and the next denomination marker is highlighted. In conjunction therewith, a bonus transition may be displayed in which the bonus prize displayed in association with at least one bonus marker is changed to a bonus prize associated with both that bonus marker and the newly highlighted denomination marker. Such operations may be repeated one or more times, if desired.

20 Claims, 15 Drawing Sheets

Related U.S. Application Data continuation of application No. 16/522,576, filed on Jul. 25, 2019, now Pat. No. 10,878,660.

(56) References Cited

U.S. PATENT DOCUMENTS

| | | | | |
|---|---|---|---|---|
| D667,451 | S | 9/2012 | Wujcik | |
| 8,323,094 | B2 | 12/2012 | Palermo | |
| D677,275 | S | 3/2013 | Wujcik | |
| D696,263 | S | 12/2013 | Ray | |
| D707,254 | S | 6/2014 | Pitt | |
| D711,895 | S | 8/2014 | Inose | |
| D727,960 | S | 4/2015 | Chaudhri | |
| D738,913 | S | 9/2015 | Cabrera-Cordon | |
| 9,214,068 | B2 | 12/2015 | Nicely | |
| D753,676 | S | 4/2016 | Oh | |
| D759,091 | S | 6/2016 | Paolantonio | |
| D759,704 | S | 6/2016 | Kettner | |
| D763,869 | S | 8/2016 | Wang | |
| D774,522 | S | 12/2016 | Joukov | |
| D784,397 | S | 4/2017 | Kim | |
| D791,786 | S | 7/2017 | Chaudhri | |
| D797,798 | S | 9/2017 | Sato | |
| D801,996 | S | 11/2017 | Yang | |
| D825,608 | S | 8/2018 | Andrizzi | |
| D825,609 | S | 8/2018 | Andrizzi | |
| D826,240 | S | 8/2018 | Andrizzi | |
| D826,255 | S | 8/2018 | Andrizzi | |
| 10,204,485 | B2 | 2/2019 | Korthauer | |
| D856,359 | S | 8/2019 | Huang | |
| D856,360 | S | 8/2019 | Huang | |
| D867,381 | S | 11/2019 | Huang | |
| D886,853 | S | 6/2020 | Clement | |
| 10,679,466 | B2 | 6/2020 | Meyerhofer | |
| D898,761 | S | 10/2020 | Kong | |
| D898,769 | S | 10/2020 | Park | |
| D900,859 | S | 11/2020 | Satterlie | |
| 2004/0248642 | A1 | 12/2004 | Rothschild | |
| 2005/0239542 | A1 | 10/2005 | Olsen | |
| 2006/0073889 | A1 | 4/2006 | Edidin | |
| 2009/0275400 | A1 | 11/2009 | Rehm | |
| 2013/0254713 | A1 | 9/2013 | Belsky | |
| 2015/0011290 | A1 | 1/2015 | Galansky | |
| 2015/0018069 | A1* | 1/2015 | Montenegro | G07F 17/326 463/20 |
| 2017/0165573 | A1 | 6/2017 | Froy | |
| 2017/0228976 | A1 | 8/2017 | Chesworth | |
| 2017/0301185 | A1 | 10/2017 | Bryant | |
| 2020/0051380 | A1 | 2/2020 | Mayo | |
| 2020/0168046 | A1 | 5/2020 | Loader | |
| 2023/0169828 | A1* | 6/2023 | Daley | G07F 17/329 463/18 |
| 2023/0334950 | A1* | 10/2023 | Meyer | G07F 17/3267 |

OTHER PUBLICATIONS

Office Action dated Oct. 21, 2020 for U.S. Appl. No. 29/699,491 (pp. 1-14).

Notice of Allowance dated Oct. 20, 2020 for U.S. Appl. No. 16/522,576 (pp. 1-8).

Office Action dated Jul. 8, 2020 for U.S. Appl. No. 16/622,576 (pp. 1-8).

Notice of Allowance dated Dec. 7, 2020 for U.S. Appl. No. 29/699,491 (pp. 1-6).

Notice of Allowability dated Nov. 17, 2020 for U.S. Appl. No. 16/522,576 (pp. 1-3).

Corrected Notice of Allowability dated Mar. 3, 2021 for U.S. Appl. No. 29/699,491 (pp. 1-2).

Office Action (Non-Final Rejection) dated May 4, 2022 for U.S. Appl. No. 17/247,477 (pp. 1-8).

Office Action (Notice of Allowance and Fees Due (PTOL-85)) dated Oct. 5, 2022 for U.S. Appl. No. 17/247,477 (pp. 1-5).

Australian Examination Report No. 1 issued in App. No. AU2019200985, dated Jun. 4, 2024, 3 pages.

* cited by examiner

300

321 322 323 324 325

331 341 342 343

| | Reel Position | Reel 1 | Reel 2 | Reel 3 | Reel 4 | Reel 5 |
|---|---|---|---|---|---|---|
| 301 | 1 | Pic 1 | 10 | Pic 3 | Q | Pic 1 |
| 302 | 2 | Wild | Q | K | A | 10 |
| 303 | 3 | J | K | 10 | 10 | A |
| 304 | 4 | Q | A | Q | Pic 2 | Pic 2 |
| 305 | 5 | 10 | Pic 2 | K | J | A |
| 306 | 6 | A | 9 | Pic 1 | Wild | Q |
| 307 | 7 | Pic 2 | Wild | J | 9 | K |
| 308 | 8 | A | Pic 3 | K | 10 | Pic 2 |
| 309 | 9 | Q | Q | 9 | A | 9 |
| 310 | 10 | K | 10 | Q | Q | Wild |
| 311 | 11 | J | A | 10 | J | 9 |
| 312 | 12 | 10 | Wild | Wild | K | Q |
| 313 | 13 | Pic 3 | K | A | Wild | 10 |
| 314 | 14 | Wild | J | A | Pic 3 | Wild |
| 315 | 15 | 9 | 10 | Wild | Pic 1 | A |

Figure 3

GAMING DEVICE AND METHOD FOR OPERATING A GAMING DEVICE

INCORPORATION BY REFERENCE

This application is a continuation application under 35 U.S.C. § 120 of U.S. patent application Ser. No. 17/247,477, filed Dec. 11, 2020, and titled "GAMING DEVICE AND METHOD FOR OPERATING A GAMING DEVICE," which itself is a continuation application under 35 U.S.C. § 120 of U.S. patent application Ser. No. 16/522,576, filed Jul. 25, 2019, and titled "GAMING DEVICE AND METHOD FOR OPERATING A GAMING DEVICE," which itself claims benefit of priority under 35 U.S.C. § 119(a) to Australian Patent Application No. 2019200985, filed Feb. 13, 2019, and titled "A GAMING DEVICE AND METHOD FOR OPERATING A GAMING DEVICE," and Australian Patent Application No. 2018902952, filed Aug. 13, 2018, and titled "A GAMING DEVICE AND METHOD FOR OPERATING A GAMING DEVICE," all of which are hereby incorporated herein by reference in their entireties.

FIELD

The present application relates to a gaming device and method for operating a gaming device

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

Some EGMs may offer multiple slot games for a player to choose from, and each such game may be offered at multiple denominations. Each combination of game and denomination may offer one or more bonus, progressive or jackpot prizes that increase in value with play. Generally speaking, a player may have to select a game and denomination combination for play in order to view the current value of the associated progressive prizes, e.g., by starting to play the game and seeing the current values in the game graphical user interface.

SUMMARY

Some implementations of the disclosure display possible denominations for play on the gaming device and a moving (e.g. sliding, bouncing or otherwise translating) highlight focusing on specific denominations. Bonuses available for play at that denomination are marked such that the bonus marker(s) synchronously change, update, or are otherwise highlighted as the highlight moves from denomination to denomination. Implementations of the disclosure are implemented on the gaming device in an attract mode configuration. Implementations of the disclosure provide an improved user interface that organizes and displays information about the bonuses available for play at various denominations with one or more games to a player in the attract mode. This enables the player to quickly select the desired game and denomination.

According to an aspect of the present disclosure, there is provided a method for operating a gaming device, comprising the steps of: (a) displaying an attract mode display on a display of the gaming device comprising one or more bonus markers and a plurality of denomination markers; (b) controlling the display to highlight one of the plurality of denomination markers; (c) determining for each bonus marker a bonus prize associated with both the particular bonus marker and the currently highlighted denomination marker and displaying said bonus prize in a region of the display associated with the particular bonus marker; (d) controlling the display to display a denomination transition comprising the highlighted denomination marker reverting to a non-highlighted representation and highlighting the next denomination marker; (e) displaying a bonus transition comprising changing the bonus prize displayed in association with at least one bonus marker to a bonus prize associated with both the particular bonus marker and the newly highlighted denomination marker; (f) repeating steps (d) and (e) at least once.

According to another aspect of the present disclosure, there is provided a gaming device comprising: an electronic display; a processor; a credit meter and a win meter; and a memory storing instructions which when executed by the processor cause the processor to: control the display to display an attract mode display on a display of the gaming device comprising one or more bonus markers and a plurality of denomination markers; control the display to highlight one of the plurality of denomination markers; determine for the, or each, bonus marker a bonus prize associated with both the particular bonus marker and the currently highlighted denomination marker and control the display to display said bonus prize in a region of the display associated with the bonus marker; undertake a repetitive process wherein the processor: controls the display to display a denomination transition comprising the highlighted denomination marker reverting to a non-highlighted representation and highlighting the next denomination marker; and controls the display to display a bonus transition comprising changing the bonus prize displayed in at least one bonus marker to a bonus prize associated with both the particular bonus marker and the newly highlighted denomination marker.

According to yet another aspect of the present disclosure, there is provided a method for operating a gaming device, comprising the steps of: a. displaying an attract mode display on a display of the gaming device comprising a plurality of denomination markers and, for each denomination marker, one or more bonus markers; b. highlighting one of the plurality of denomination markers and simultaneously highlighting its associated bonus marker(s); c. displaying a denomination transition comprising the highlighted denomination marker and its associated bonus markers reverting to a non-highlighted representation and highlighting the next denomination marker and its associated bonus marker(s); and d. repeating step (c) after a predetermined time.

According to still yet another aspect of the present disclosure, there is provided a gaming device comprising: an electronic display; a processor; a credit meter and a win meter; and a memory storing instructions which when executed by the processor cause the processor to: control the display to display an attract mode display on a display of the gaming device comprising a plurality of denomination markers and, for each denomination marker, one or more bonus markers; control the display to highlight one of the plurality of denomination markers and simultaneously highlighting its associated bonus marker(s); undertake a repetitive process wherein the processor: controls the display to display a denomination transition comprising the highlighted denomination marker and its associated bonus markers reverting to a non-highlighted representation and highlighting the next denomination marker and its associated bonus marker(s).

In some implementations, a method for operating a gaming device is provided. The method may include a) displaying an attract mode display on one or more displays of the gaming device, the attract mode display including one or more bonus markers and a plurality of denomination markers, each denomination marker displaying a corresponding denomination; b) controlling the one or more displays to highlight one of the denomination markers; c) determining, for each bonus marker, a bonus prize associated with that bonus marker and the denomination marker highlighted in (b) and displaying that bonus prize in a region of the one or more displays associated with that bonus marker; d) controlling the one or more displays to display a denomination transition in which the currently highlighted denomination marker reverts to a non-highlighted representation and a subsequent denomination marker is highlighted; and e) displaying a bonus transition in which the bonus prize displayed in association with at least one bonus marker changes to another bonus prize associated with both that bonus marker and the denomination marker highlighted in (d). In some implementations, steps (d) and (e) may be repeated at least once.

In some implementations, the method may further include displaying a plurality of game markers, each game marker associated with a different wagering game and one or more game denominations for the associated wagering game, with each game denomination corresponding with one of the denomination markers.

In some implementations, the method may further include displaying a game highlight marker and causing, for the currently highlighted denomination marker, graphical content associated with at least one of the wagering games having a game denomination that corresponds with the currently highlighted denomination marker to be displayed.

In some implementations, the method may further include receiving an input signal indicative of a player selection of a first game marker of the game markers, wherein the first game marker is associated with a first wagering game of the wagering games; exiting the attract mode display; providing the first wagering game for play on the gaming device; receiving a denomination input signal indicative of a first game denomination of the game denominations associated with the first game marker; receiving one or more player input signals indicative of player selections during play of the first wagering game using the first denomination; determining, responsive to receipt of one of the one or more player input signals, that a winning outcome has occurred in the first wagering game (where the winning outcome is associated with a first bonus prize associated with a first bonus marker of the one or more bonus markers and the first bonus prize corresponds with the bonus prize that was displayed in the region of the one or more displays associated with the first bonus marker during the display of the attract and while the denomination marker associated with the first denomination was highlighted; and awarding the first bonus prize to the player.

In some implementations, the plurality of denomination markers may be displayed as an ordered sequence of denominations.

In some implementations, the denomination marker highlighted in (d) may be associated with the next denomination in the ordered sequence of denominations from the denomination associated with the denomination marker that is reverted to the non-highlighted representation in (d).

In some implementations, the highlighting of the denomination markers in the ordered sequence may be cyclical such that highlighting of the denomination marker of the ordered sequence with the highest value is followed by highlighting of the denomination marker of the ordered sequence with the lowest value.

In some implementations, the denomination transition may occur over a predetermined period of time.

In some implementations, the attract mode display may further include a highlight marker and each highlighted denomination marker may be highlighted by modifying that denomination marker with the highlight marker.

In some implementations, the denomination transition may include moving the highlight marker from the denomination marker to be reverted to a non-highlighted representation in (d) to the subsequent denomination marker.

In some implementations, the one or more bonus markers may include at least a first bonus marker and a second bonus marker, a first numerical value for the bonus prize associated with the first bonus marker may be the same regardless of which denomination marker is highlighted, and a second numerical value for the bonus prize associated with the second bonus marker may be different for every highlighted denomination marker.

In some implementations, (d) to (e) may be repeated until an input is received indicative of a player interaction with the gaming device, and the attract mode display may be interrupted responsive to receipt of the input.

In some implementations, the method may further include providing an interface configured to present a plurality of games available for play, receiving an input indicative of a player selection of one of the games, and interrupting the attract mode display responsive to receipt of the input.

In some implementations, the one or more displays may include a touchscreen and the input indicative of a player selection of one of the games may be provided by touch input provided to the touchscreen.

In some implementations, the method may further include displaying a game animation region displaying a sequence of images or animations, in which each image or animation may indicate a specific game available for play on the gaming device, and transitions between each displayed image or animation may occur with a time period different to a predetermined time period between denomination transitions.

In some implementations, each denomination transition may occur after a predetermined time period has elapsed.

In some implementations, a gaming device may be provided that includes one or more displays, one or more processors, and a memory. The memory, the one or more processors, and the one or more displays may be operatively connected, and the memory may store computer-executable instructions which, when executed by the one or more processors, cause the one or more processors to: a) control the one or more displays to display an attract mode display that includes one or more bonus markers and a plurality of denomination markers, each denomination marker displaying a corresponding denomination; b) control the one or more displays to highlight one of the denomination markers; c) determine, for each bonus marker, a bonus prize associated with that bonus marker and the denomination marker highlighted in (b) and control the one or more displays to display that bonus prize in a region of the one or more displays associated with that bonus marker; d) control the one or more displays to display a denomination transition in which the currently highlighted denomination marker reverts to a non-highlighted representation and highlighting the next denomination marker; and e) control the one or more displays to display a bonus transition in which the bonus prize displayed in association with at least one bonus marker changes to a bonus prize associated with both that bonus marker and the denomination marker highlighted in (d). In some implementations, (d) and (e) may be repeated at least once by the gaming device.

In some implementations, the plurality of denomination markers may include an ordered sequence of denominations.

In some implementations, the denomination markers may be displayed such that the corresponding denominations of the denomination markers are arranged in an ordered sequence from smallest denomination to largest denomination.

In some implementations, the denomination markers may be displayed on the one or more displays in the order of the ordered sequence.

In some implementations, the memory may store further computer-executable instructions which, when executed by the one or more processors, further cause the one or more processors to highlight the denomination marker in (d) based on that denomination marker being associated with the next denomination in the sequence of denominations from the denomination associated with the denomination marker that is reverted to the non-highlighted representation in (d).

In some implementations, the ordered sequence may be cyclical such that the last denomination marker of the ordered sequence is followed by the first denomination marker of the ordered sequence.

In some implementations, the memory may store further computer-executable instructions which, when executed by the one or more processors, further cause the one or more processors to cause the denomination transition to occur over a predetermined period of time.

In some implementations, the memory may store further computer-executable instructions which, when executed by the one or more processors, further cause the one or more processors to cause the attract mode display to further include a highlight marker and to highlight each highlighted denomination marker by modifying the display of that denomination marker with the highlight marker.

In some implementations, the memory may store further computer-executable instructions which, when executed by the one or more processors, further cause the one or more processors to cause the denomination transition to include moving the highlight marker from the denomination marker to be reverted to a non-highlighted representation in (d) to the subsequent denomination marker on the one or more displays.

In some implementations, the memory may store further computer-executable instructions which, when executed by the one or more processors, further cause the one or more processors to cause the one or more bonus markers to include at least a first bonus marker and a second bonus marker, cause a first numerical value for the bonus prize associated with the first bonus marker to be the same regardless of which denomination marker is highlighted, and cause a second numerical value for the bonus prize associated with the second bonus marker to be different for every highlighted denomination marker.

In some implementations, the memory may store further computer-executable instructions which, when executed by the one or more processors, further cause the one or more processors to: cause (d) to (e) to be repeated until an input is received indicative of a player interaction with the gaming device and interrupt the attract mode display responsive to receipt of the input.

In some implementations, the memory may store further computer-executable instructions which, when executed by the one or more processors, further cause the one or more processors to cause the one or more displays to provide an interface presenting a plurality of games that are available for play on the gaming device, where the input is indicative of a player game selection from the plurality of games.

In some implementations, the one or more displays may be a touchscreen and the memory may store further computer-executable instructions which, when executed by the one or more processors, further cause the one or more processors to cause the input to be received via the touchscreen.

In some implementations, the memory may store further computer-executable instructions which, when executed by the one or more processors, further cause the one or more processors to: control the one or more displays to display a game animation region displaying a sequence of images or animations. In such implementations, each image or animation may indicate a specific game available for play on the gaming device, and transitions between each displayed image or animation may occur with a time period different to a predetermined time between denomination transitions.

In some implementations, the memory may store further computer-executable instructions which, when executed by the one or more processors, further cause the one or more processors to cause each denomination transition to occur after a predetermined period of time has elapsed.

In some implementations, a gaming device may be provided that includes one or more displays, one or more processors, and a memory. The memory, the one or more processors, and the display may be operatively connected, and the memory may store computer-executable instructions which, when executed by the one or more processors, cause the one or more processors to: a) control the one or more displays to display an attract mode display that includes one or more bonus markers and a plurality of denomination markers, each denomination marker displaying a corresponding denomination; b) control the one or more displays to highlight one of the denomination markers; c) determine, for each bonus marker, a bonus prize associated with that bonus marker and the denomination marker highlighted in (b) and control the one or more displays to display that bonus prize in a region of the one or more displays associated with that bonus marker; d) control the one or more displays to display a denomination transition in which the currently highlighted denomination marker reverts to a non-highlighted representation and highlighting the next denomination marker; and e) control the one or more displays to display a bonus transition in which the bonus prize displayed in association with at least one bonus marker changes to a bonus prize associated with both that bonus marker and the denomination marker highlighted in (d). In some implementations, the instructions may cause (d) and (e) to be repeated at least once.

In some implementations, the memory may store further computer-executable instructions which, when executed by the one or more processors, further cause the one or more processors to display a plurality of game markers on the one or more displays, each game marker associated with a different wagering game, where each wagering game may be associated with one or more game denominations and each game denomination corresponds with one of the denomination markers In some implementations, the memory may store further computer-executable instructions which, when executed by the one or more processors, further cause the one or more processors to: cause a game highlight marker to be displayed on the one or more displays of the gaming device and cause, for the currently highlighted denomination marker, graphical content associated with at least one of the wagering games having a game denomination that corresponds with the currently highlighted denomination marker to be displayed.

In some implementations, the memory may store further computer-executable instructions which, when executed by the one or more processors, further cause the one or more processors to: receive an input signal indicative of a player selection of a first game marker of the game markers (where the first game marker may be associated with a first wagering game of the wagering games); cause the gaming device to exit the attract mode display; provide the first wagering game for play on the gaming device; receive a denomination input signal indicative of a first game denomination of the game denominations associated with the first game marker; receive one or more player input signals indicative of player selections during play of the first wagering game using the first denomination; determine, responsive to receipt of one of the one or more player input signals, that a winning outcome has occurred in the first wagering game (where the winning outcome may be associated with a first bonus prize associated with a first bonus marker of the one or more bonus markers and the first bonus prize corresponds with the bonus prize that was displayed in the region of the one or more displays associated with the first bonus marker during the display of the attract mode display and while the denomination marker associated with the first denomination was highlighted); and award the first bonus prize to the player.

In some implementations, the memory may store further computer-executable instructions which, when executed by the one or more processors, further cause the one or more processors to cause the plurality of denomination markers to be displayed as an ordered sequence of denominations.

In some implementations, the memory may store further computer-executable instructions which, when executed by the one or more processors, further cause the one or more processors to highlight the denomination marker in (d) based on that denomination marker being associated with the next denomination in the ordered sequence of denominations from the denomination associated with the denomination marker that is reverted to the non-highlighted representation in (d).

In some implementations, the memory may store further computer-executable instructions which, when executed by the one or more processors, further cause the one or more processors to highlight the denomination markers in a cyclical manner such that the highlighting of the highest value denomination marker is followed by the highlighting of the lowest value denomination marker.

In some implementations, the memory may store further computer-executable instructions which, when executed by the one or more processors, further cause the one or more processors to cause the attract mode display to further include a highlight marker and to highlight each highlighted denomination marker by modifying the display of that denomination marker with the highlight marker.

In some implementations, the memory may store further computer-executable instructions which, when executed by the one or more processors, further cause the one or more processors to cause the denomination transition to include moving the highlight marker from the denomination marker to be reverted to a non-highlighted representation in (d) to the subsequent denomination marker on the one or more displays.

In some implementations, the memory may store further computer-executable instructions which, when executed by the one or more processors, further cause the one or more processors to: cause the one or more bonus markers to include at least a first bonus marker and a second bonus marker, cause a first numerical value for the bonus prize associated with the first bonus marker to be the same regardless of which denomination marker may be highlighted, and cause a second numerical value for the bonus prize associated with the second bonus marker to be different for every highlighted denomination marker.

In some implementations, a computer-readable, non-transitory medium may be provided that stores one or more computer-executable instructions for controlling one or more processors of an electronic gaming machine having one or more display devices, where the computer-executable instructions stored on the computer-readable, non-transitory medium are configured to, when executed by the one or more processors, control the one or more processors to cause the one or more processors to: a) control the one or more display devices to display an attract mode display that includes one or more bonus markers and a plurality of denomination markers, each denomination marker displaying a corresponding denomination; b) control the one or more display devices to highlight one of the denomination markers; c) determine, for each bonus marker, a bonus prize associated with that bonus marker and the denomination marker highlighted in (b) and control the one or more display devices to display that bonus prize in a region of the one or more display devices associated with that bonus marker; d) control the one or more display devices to display a denomination transition in which the currently highlighted denomination marker reverts to a non-highlighted representation and highlighting the next denomination marker; e) control the one or more display devices to display a bonus transition in which the bonus prize displayed in association with at least one bonus marker changes to a bonus prize associated with both that bonus marker and the denomination marker highlighted in (d); and f) repeat (d) and (e) at least once.

In some implementations, the computer-readable, non-transitory medium may further store additional computer-executable instructions configured to, when executed by the one or more processors, control the one or more processors to display a plurality of game markers on the one or more display devices, each game marker associated with a different wagering game, where each wagering game may be associated with one or more game denominations and each game denomination corresponds with one of the denomination markers.

In some implementations, the computer-readable, non-transitory medium further may store additional computer-executable instructions configured to, when executed by the one or more processors, control the one or more processors to: cause a game highlight marker to be displayed on the one or more display devices of the gaming device and cause, for the currently highlighted denomination marker, graphical content associated with at least one of the wagering games having a game denomination that corresponds with the currently highlighted denomination marker to be displayed.

In some implementations, the computer-readable, non-transitory medium may further store additional computer-executable instructions configured to, when executed by the one or more processors, control the one or more processors to: receive an input signal indicative of a player selection of a first game marker of the game markers, where the first game marker may be associated with a first wagering game of the wagering games; cause the gaming device to exit the attract mode display; provide the first wagering game for play on the gaming device; receive a denomination input signal indicative of a first game denomination of the game denominations associated with the first game marker; receive one or more player input signals indicative of player selections during play of the first wagering game using the first denomination; determine, responsive to receipt of one of the one or more player input signals, that a winning outcome has occurred in the first wagering game (where the winning outcome may be associated with a first bonus prize associated with a first bonus marker of the one or more bonus markers, and the first bonus prize corresponds with the bonus prize that was displayed in the region of the one or more display devices associated with the first bonus marker during the display of the attract mode display and while the denomination marker associated with the first denomination was highlighted); and award the first bonus prize to the player.

In some implementations, the computer-readable, non-transitory medium may further store additional computer-executable instructions configured to, when executed by the one or more processors, control the one or more processors to cause the plurality of denomination markers to be displayed as an ordered sequence of denominations.

In some implementations, the computer-readable, non-transitory medium may further store additional computer-executable instructions configured to, when executed by the one or more processors, control the one or more processors to highlight the denomination marker in (d) based on that denomination marker being associated with the next denomination in the ordered sequence of denominations from the denomination associated with the denomination marker that is reverted to the non-highlighted representation in (d).

In some implementations, the computer-readable, non-transitory medium may further store additional computer-executable instructions configured to, when executed by the one or more processors, control the one or more processors to highlight the denomination markers in a cyclical manner such that the highlighting of the highest value denomination marker is followed by the highlighting of the lowest value denomination marker.

In some implementations, the computer-readable, non-transitory medium may further store additional computer-executable instructions configured to, when executed by the one or more processors, control the one or more processors to cause the attract mode display to further include a highlight marker and to highlight each highlighted denomination marker by modifying the display of that denomination marker with the highlight marker.

In some implementations, the computer-readable, non-transitory medium may further store additional computer-executable instructions configured to, when executed by the one or more processors, control the one or more processors to cause the denomination transition to include moving the highlight marker from the denomination marker to be reverted to a non-highlighted representation in (d) to the subsequent denomination marker on the one or more display devices.

In some implementations, the computer-readable, non-transitory medium may further store additional computer-executable instructions configured to, when executed by the one or more processors, control the one or more processors to cause the one or more bonus markers to include at least a first bonus marker and a second bonus marker, cause a first numerical value for the bonus prize associated with the first bonus marker to be the same regardless of which denomination marker is highlighted, and cause a second numerical value for the bonus prize associated with the second bonus marker to be different for every highlighted denomination marker.

In some implementations, a method for operating a gaming device may be provided. The method may include a) displaying an attract mode display on one or more displays of the gaming device, the attract mode display including one or more bonus markers and a plurality of denomination markers, each denomination marker displaying a corresponding denomination; b) controlling the one or more displays to highlight one of the denomination markers; c) determining, for each bonus marker, a bonus prize associated with that bonus marker and the denomination marker highlighted in (b) and displaying that bonus prize in a region of the one or more displays associated with that bonus marker; d) controlling the one or more displays to display a denomination transition in which the currently highlighted denomination marker reverts to a non-highlighted representation and a subsequent denomination marker is highlighted; e) displaying a bonus transition in which the bonus prize displayed in association with at least one bonus marker changes to another bonus prize associated with both that bonus marker and the denomination marker highlighted in (d); and f) repeating steps (d) and (e) at least once.

In some implementations, the method may further include displaying a plurality of game markers on the one or more displays of the gaming device, each game marker associated with a different wagering game, in which each wagering game may be associated with one or more game denominations and each game denomination corresponds with one of the denomination markers.

In some implementations, the method may further include displaying a game highlight marker on the one or more displays of the gaming device and causing, for the currently highlighted denomination marker, graphical content associated with at least one of the wagering games having a game denomination that corresponds with the currently highlighted denomination marker to be displayed.

In some implementations, the method may further include receiving an input signal indicative of a player selection of a first game marker of the game markers, where the first game marker may be associated with a first wagering game of the wagering games; exiting the attract mode display; providing the first wagering game for play on the gaming device; receiving a denomination input signal indicative of a first game denomination of the game denominations associated with the first game marker; receiving one or more player input signals indicative of player selections during play of the first wagering game using the first denomination; determining, responsive to receipt of one of the one or more player input signals, that a winning outcome has occurred in the first wagering game (where the winning outcome may be associated with a first bonus prize associated with a first bonus marker of the one or more bonus markers, and the first bonus prize corresponds with the bonus prize that was displayed in the region of the one or more displays associated with the first bonus marker during the display of the attract mode display and while the denomination marker associated with the first denomination was highlighted); and awarding the first bonus prize to the player.

In some implementations, the plurality of denomination markers may be displayed as an ordered sequence of denominations.

In some implementations, the denomination marker highlighted in (d) may be associated with the next denomination in the ordered sequence of denominations from the denomination associated with the denomination marker that is reverted to the non-highlighted representation in (d).

In some implementations, the highlighting of the denomination markers in the ordered sequence may be cyclical such that highlighting of the denomination marker of the ordered sequence with the highest value is followed by highlighting of the denomination marker of the ordered sequence with the lowest value.

In some implementations, the attract mode display may further include a highlight marker and each highlighted denomination marker is highlighted by modifying that denomination marker with the highlight marker.

In some implementations, the denomination transition may include moving the highlight marker from the denomination marker to be reverted to a non-highlighted representation in (d) to the subsequent denomination marker.

In some implementations, the one or more bonus markers may include at least a first bonus marker and a second bonus marker, a first numerical value for the bonus prize associated with the first bonus marker may be the same regardless of which denomination marker is highlighted, and a second numerical value for the bonus prize associated with the second bonus marker may be different for every highlighted denomination marker.

BRIEF DESCRIPTION OF THE DRAWINGS

FIG. 3 illustrates an example reel strip layout.

DETAILED DESCRIPTION

Figure 1:
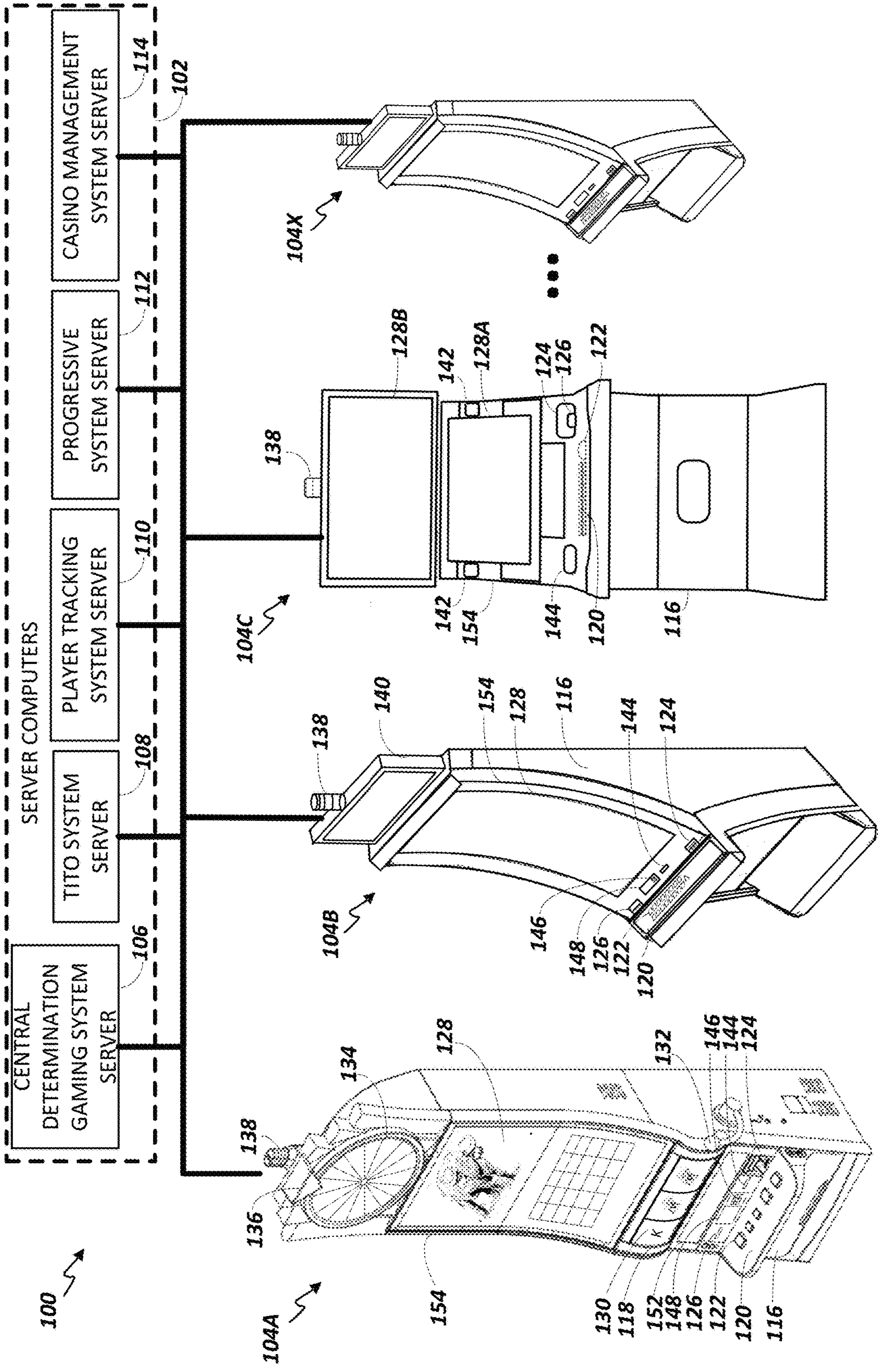
FIG. 1 is an exemplary diagram showing several EGMs networked with various gaming related servers.

FIG. 1 illustrates several different models of EGMs which may be networked to various gaming related servers. Implementations of the present disclosure can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other implementations, the gaming devices 104A-104X may communicate with one another and/or the server computers 102 over RF, cable TV, satellite links and the like.

In some implementations, server computers 102 may not be necessary and/or preferred. For example, one or more implementations, may be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In implementations where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some implementations a ticket reader can be used which is only capable of reading tickets. In some implementations, a different form of token can be used to store a cash value, such as a magnetic stripe card.

In some implementations, a player tracking card reader 144, a transceiver for wireless communication with a player's smartphone, a keypad 146, and/or an illuminated display 148 for reading, receiving, entering, and/or displaying player tracking information is provided in EGM 104A. In such implementations, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2:
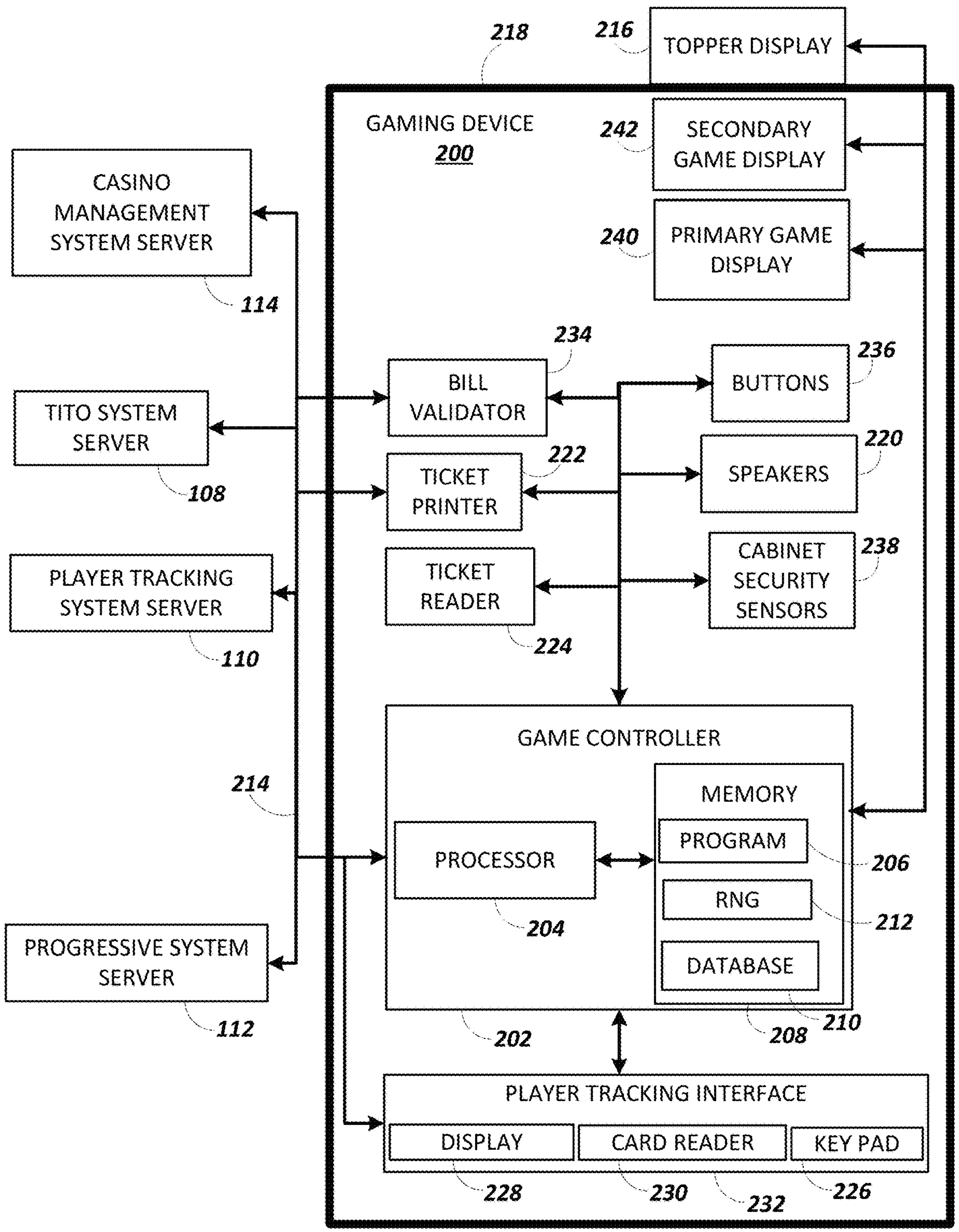
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some implementations, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some implementations, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some implementations, a player's selection may apply across a plurality of game instances. For example, if the player is awarded additional game instances in the form of free games, the player's prior selection of the amount bet per line and the number of lines played may apply to the free games. The selections available to a player will vary depending on the implementation. For example, in some implementations a number of pay lines may be fixed. In other implementations, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

FIG. 3 illustrates an example of a set 300 of five reel strips 321, 322, 323, 324, and 325. In the example, each reel strip has fifteen reel strip positions 301-315. Each reel strip position of each reel has a symbol. For example, a "Wild" symbol 331 occupies the sixth reel strip position 306 of the fourth reel 324. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual length of the feature game reel strips would depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 4:
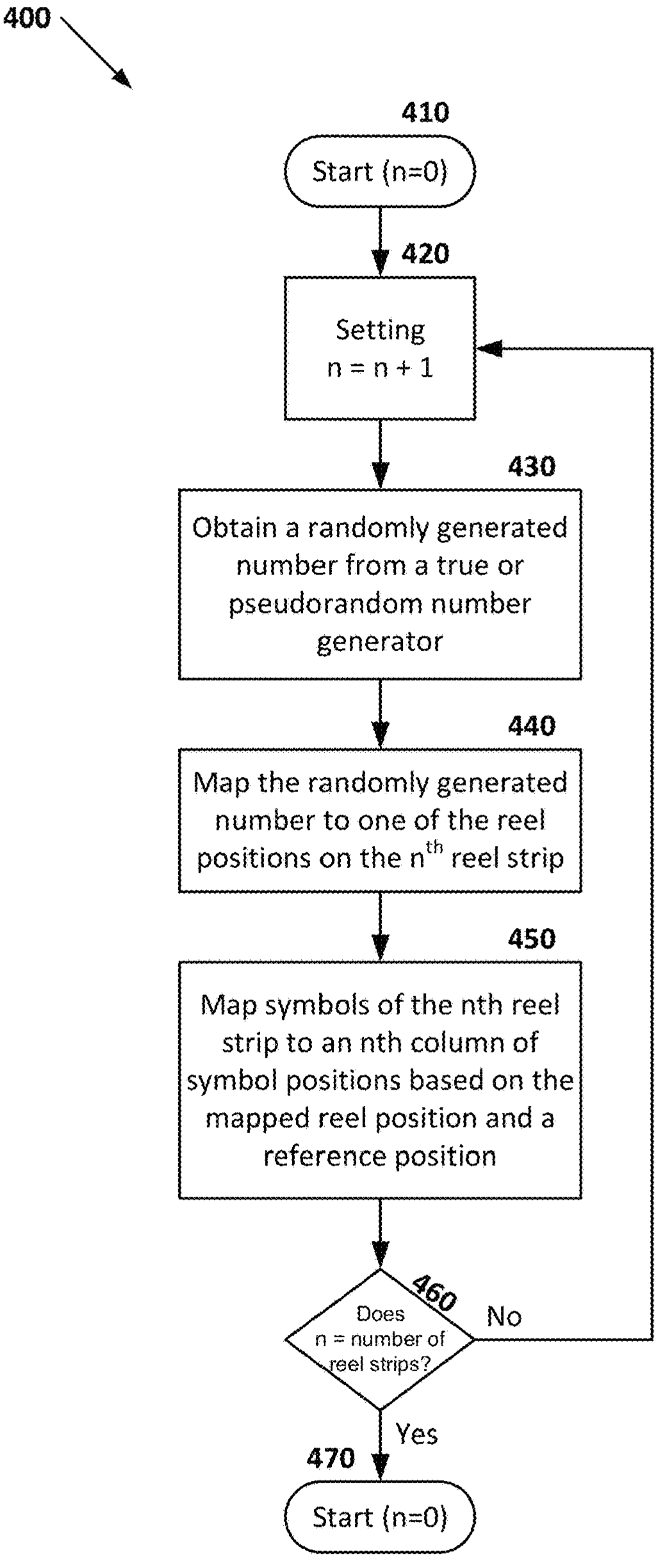
FIG. 4 is a flow chart of a symbol selection method.

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430 the processor obtains a randomly generated number from a true or pseudo random number generator 212. At step 440 the processor maps the generated number to one of the reel positions of the $n^{th}$ reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to an nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column. Referring to the example reel strips of FIG. 3, if the value returned by the RNG 212 is mapped to reel position 313, then for the first reel strip 321, "Pic3" symbol 343 is mapped to a bottom symbol position, "10" symbol 342 is mapped to a middle symbol position, and "J" symbol is mapped to a top symbol position.

At step 460, the processor determines whether symbols have been selected for all of the reel strips, and if not the processor reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions.

Figure 5:
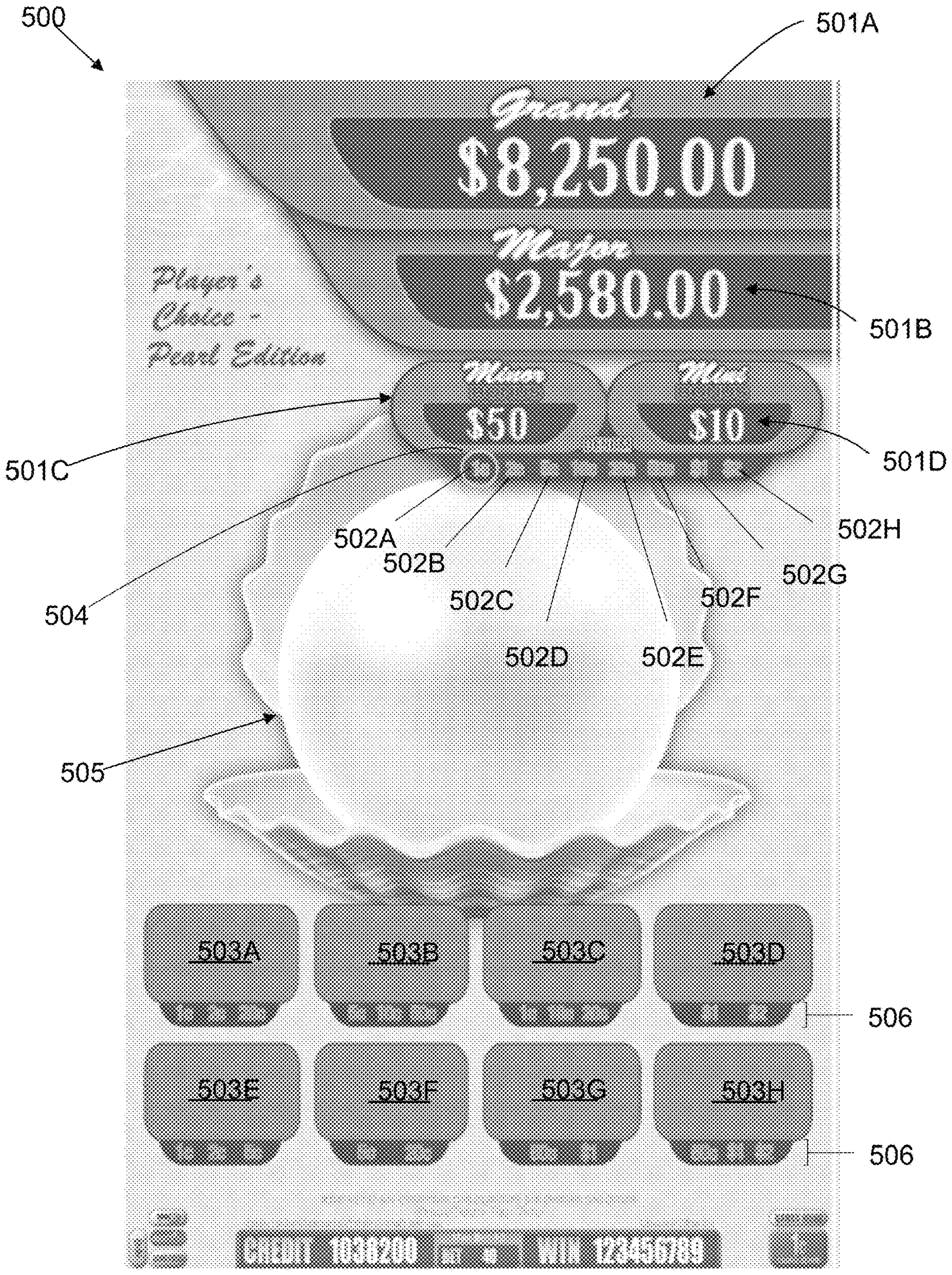
FIG. 5 shows an attract display according to an implementation.

FIG. 5 shows primary display 240 in an attract mode configuration, and displaying an associated attract mode display. Attract mode can be considered an attraction activity implemented by the gaming device 200 while a game is not in play—for example, when there is no player currently interacting and playing game(s) provided by the gaming device 200. It should be noted that although reference is made to the primary display 240 herein, the secondary display 242 or the topper display 216, or any other display of the gaming device 200, can alternatively be utilized in place of the primary display 240 in implementations.

The primary display 240 displays an attract interface 500. The primary display 240 in the implementation described includes a touchscreen for receiving player inputs. However, an alternative implementation utilizes (at least in part) player-input buttons 236 to provide the user input functionality described. The attract interface 500 comprises bonus markers 501A-501D and denomination markers 502A-502H. Additionally, the attract interface 500 can comprise game markers 503A-503H and game animation region 505.

The denomination markers 502A-502H show different denomination values (e.g. monetary values) available for playing on the gaming device 200. Typically, there will be a plurality of denomination markers 502A-502H arranged in order (e.g. from left to right) of increasing denomination value (as shown). Therefore, each denomination marker 502A-502H can show a numerical value and, optionally, an associated monetary unit (e.g. "cents" or "dollars").

Figure 6:
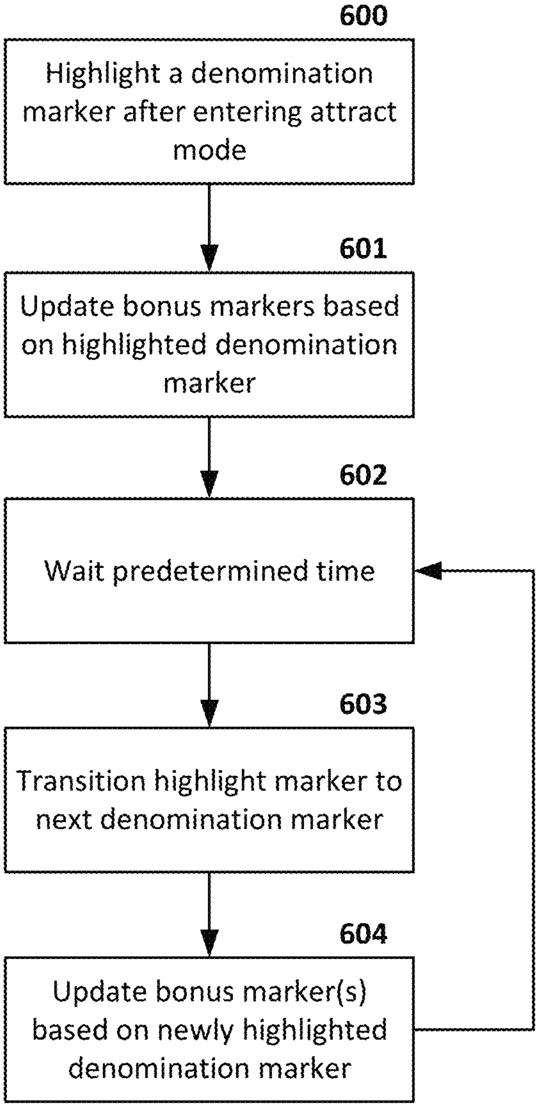
FIG. 6 shows a method for highlighting denominations and displaying associated bonuses, according to an implementation.

Referring to FIG. 6, a method for operating the gaming device 200 is shown whereby the gaming device 200 displays an animation relating to the denomination markers 502A-502H, comprising a highlight marker 504 moving between the different denomination markers 502A-502H. When the gaming device 200 first enters the attract mode, one of the denomination markers 502A-502H is highlighted with the highlight marker 504, at step 600.

Figure 7A:
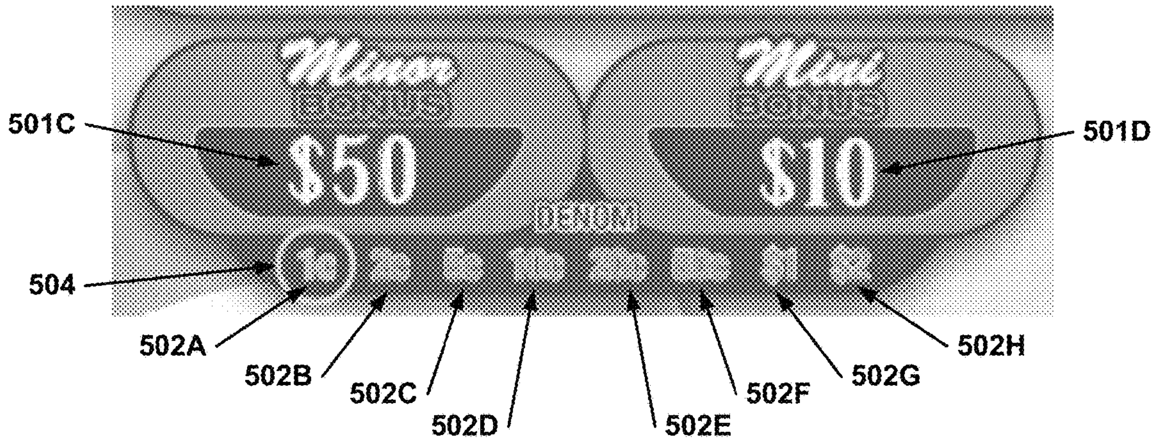
FIGS. 7A, 7B, and 7C show the transition of a highlight marker between denominations.

FIG. 7A shows the display 240 with denomination marker 502A highlighted, as a result of step 600. The highlight marker 504 is shown in FIG. 7A as a circle surrounding the denomination value of denomination marker 502A. Additionally, the denomination value may be temporarily colored differently to the denomination values of the non-highlighted denomination markers 502B-502H. Generally, any suitable highlighting effect may be utilized in addition to the highlight marker 504. For example, highlighting effects may include, but are not limited to a marker that remains in a particular shape, e.g., a circle, an obround, a rectangle, a star, etc., and can be moved from denomination marker to denomination marker to emphasize different denomination markers; a marker that is represented by a particular style or graphical presentation that is applied to the selected denomination marker, e.g., rendering the selected denomination marker in a different color font than the other denomination markers, applying a "glow" or "flames" effect to the text of the selected denomination marker that is not applied to the other denomination markers; or animating the select denomination marker in a particular way as compared with animations, or lack thereof, of the other denomination markers, e.g., causing the selected denomination marker to spin, rotate, or cyclically grow and shrink or pulse in size.

In an implementation, the smallest denomination marker 502A is selected for highlighting when the gaming device 200 enters attract mode after being in another mode (e.g. after finishing of gameplay or directly after initiation of the gaming device 200). In another implementation, where applicable, a previously highlighted denomination marker 502A-502H (e.g. before entering a gameplay mode of the gaming device 200) is highlighted when the gaming device 200 enters attract mode. In yet another implementation, a random denomination marker 502A-502H is highlighted when the gaming device 200 enters attract mode.

The bonus markers 501A-501D relate to different bonuses available during play of a game. In the examples described herein: bonus marker 501A corresponds to a "Grand" bonus; bonus marker 501B corresponds to a "Major" bonus; bonus marker 501C corresponds to a "Minor" bonus; and bonus marker 501D corresponds to a "Mini" bonus. Typically, each bonus marker 501A-501D will display a bonus prize—for example, a monetary award (e.g. in FIG. 7A these are "$8,250.00", "$2,580.00", "$50", and "$10", respectively). The numerical value of one bonus marker 501A-501D will typically be different to the numerical value of each of the other bonus markers 501A-501D.

The gaming device 200 is configured to update the bonus markers 501A-501D to display the applicable awards associated with the currently highlighted denomination marker 502A-502H, at step 601. One or more of the bonus markers 501A-501D will comprises different bonus prizes in association with different denomination markers 502A-502H. In some implementations, there are also one or more bonus markers 501A-502D in which the bonus prize does not change in dependence on the highlighted bonus marker 502A-502H. However, in a general sense, at step 601, the gaming device 200 determines bonus prizes to display in each bonus prize marker 501A-501D based on the currently highlighted denomination marker 502A-502H. For example, the processor 204 is configured to perform a look-up operation in a look-up table containing a list of possible denomination values and their corresponding bonus prizes by matching the denomination value of the currently highlighted denomination marker to determine the relevant bonus prizes for display.

At step 602, the gaming device 200 waits for a predetermined time (e.g. 2 seconds) to elapse after denomination marker 502A is highlighted. In the present implementation, the same predetermined time is associated with each denomination marker 502A-502H (i.e. the highlight marker 504 spends the same amount of time associated with each denomination marker 502A-502H). In other implementations, different predetermined times are associated with denomination markers 502A-502H, for example, with higher-valued denominators associated with longer times (and vice versa).

Figure 7B:
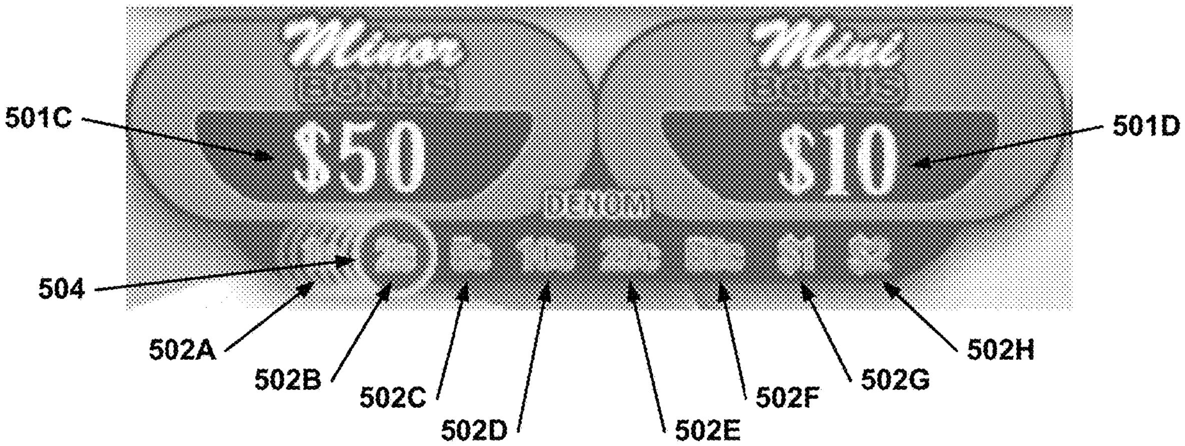
Figure 7C:
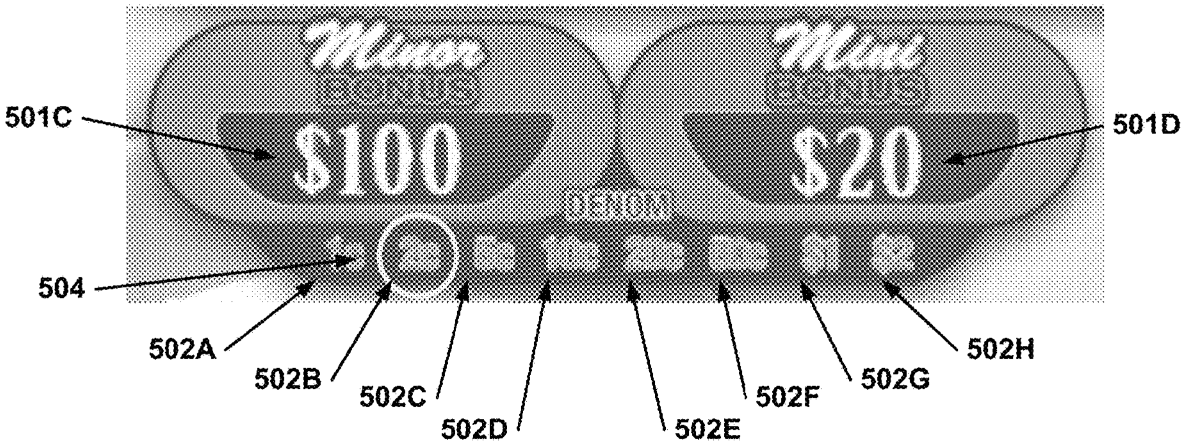

At step 603, after the predetermined time, the highlight marker 504 undergoes a transition, typically in the form of an animation, such as a translational transition, from the current denomination marker 502A to a selected next denomination marker 502B-502H; in the implementation shown, this is second denomination marker 502B. The transition typically occurs over a predetermined time (e.g. 1 second). Referring to FIG. 7B, the transition comprises the appearance of the highlight marker 504 sliding, in the implementation shown, bouncing or otherwise translating to the right. As a result of the transition, it is denomination marker 502B that is highlighted by the highlight marker 504, and denomination marker 502A is returned to have similar appearance to denomination markers 502C-502H, as shown in FIG. 7C.

The transition is also associated with a change in display of one or more of the bonus markers 501A-501D, at step 604. For example, in the implementation shown, the numerical values of bonus markers 501C-501D are changed whereas the numerical values of bonus markers 501A-501B are not changed. More generally, at least one of the bonus markers 501A-501D will have its numerical value changed in association with the transition. Any suitable visual change may be utilized for the bonus markers 501A-501D which are changed. For example, the bonus markers may simply change from one value to another once the new denomination marker is highlighted, fade from one value to another, or transition in an animated fashion, e.g., rapidly transition through sequential numbers counting up or down from the previously displayed value to the new value associated with the highlighted denomination marker. In some instances, an animation may precede the change in bonus marker value. For example, when a new denomination marker is highlighted, the value of a bonus marker associated with the most recently highlighted denomination marker may continue to be shown. However, the highlighting of the new denomination marker may be immediately followed by the start of an animation that involves the bonus marker, e.g., a lightning bolt animation that arcs out from the highlight marker and/or the highlighted denomination marker and may "strike" the bonus marker, at which point the bonus marker value may be updated to the value associated with the highlighted denomination marker. For example, the example lightning bolt animation described above may include a "charging" animation in which the lightning bolt continues to extend between the highlighted denomination marker and the bonus marker (although it may move or jump around to various locations on screen while doing so) while the bonus marker may be caused to glow or have a nimbus of light around it, during which the values shown in the bonus marker may be caused to rapidly increment until the new value for the bonus marker associated with the highlighted denomination marker is reached. Depending on the nature and length of the animation, there may be a noticeable delay between when the denomination marker is highlighted and when such a bonus marker value may be updated, which may heighten interest and suspense in any onlookers. Such animation effects may also be accompanied by appropriate audio effects, such as the sound of thunder, electrical arcing, clinking coins, etc.

The denomination markers 502A-502H are arranged in an ordered sequence, i.e., 502A→502B→502C→502D→502E→502F→502G→502H.

The ordering is typically in order of denomination value. The reference to sliding to the "right" above is not intended to be limiting; generally, it may be preferred that the sliding occurs such that the next smallest denomination follows the current denomination. The ordered sequence is typically cyclical, such that the largest denomination is followed by the smallest, e.g., denomination marker 502H is followed by 502A.

Other than being translational, the displayed transition can alternatively or additionally be, for example, the appearance of the highlight marker 504 dissolving, fading, or otherwise disappearing from the right side and reappearing in like form at the left side (or vice-versa depending on the direction traveled by the highlight marker 504). Another example of the displayed transition is the appearance of the highlight marker 504 moving from denomination marker 502H to denomination marker 502A (that is, in the reverse direction to the other transitions, e.g., from highest denomination to lowest denomination). In another implementation, the highlight marker 504 is configured to move from the lowest denomination to the highest denomination, and then back in the reverse direction from the highest denomination to the lowest denomination, and so forth.

Steps 602-604 are repeated such that, over a period of time, each denomination marker 502A-502H is highlighted by the highlight marker 504. For example, the method may repeat such that the ordered sequence of denominations is followed.

The method will end if the gaming device 200 identifies an interrupt to the attract mode. For example, if the gaming device 200 receives an input from the player selecting a particular game for play. This may happen at any time during, for example, a transition or during the predetermined time that the highlight marker 504 is associated with a particular denomination marker 502.

Figure 9A:
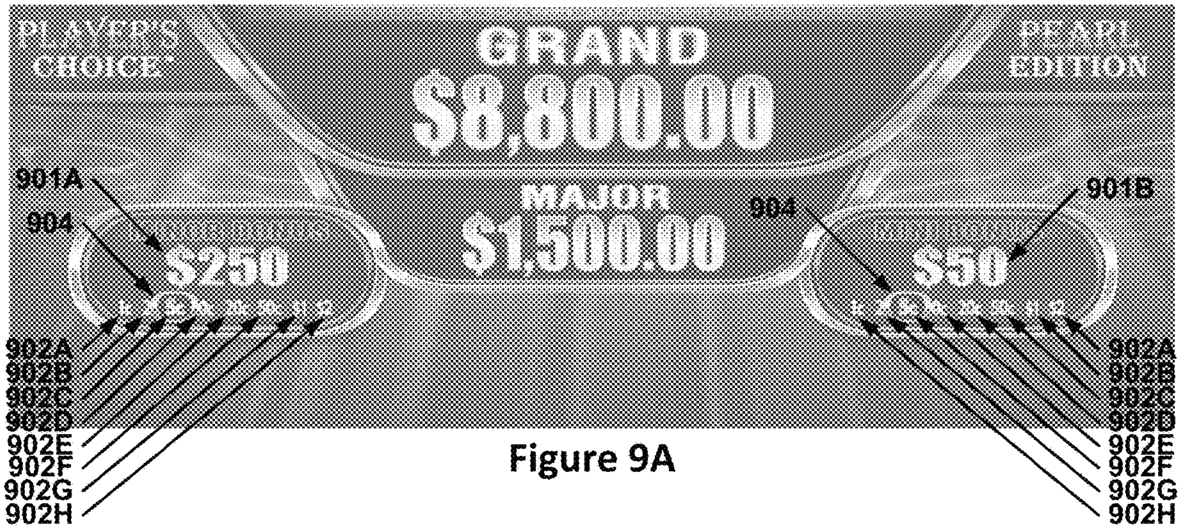
FIGS. 9A-9E show the transition of a highlight marker between denominations for an alternative layout to that shown in FIGS. 7A-7C.
Figure 9B:
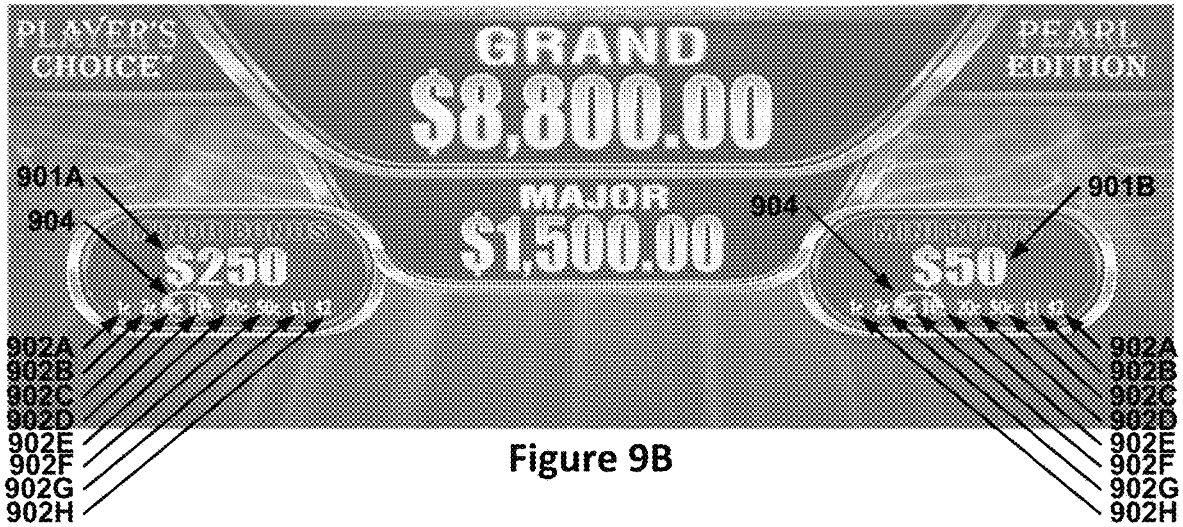
Figure 9C:
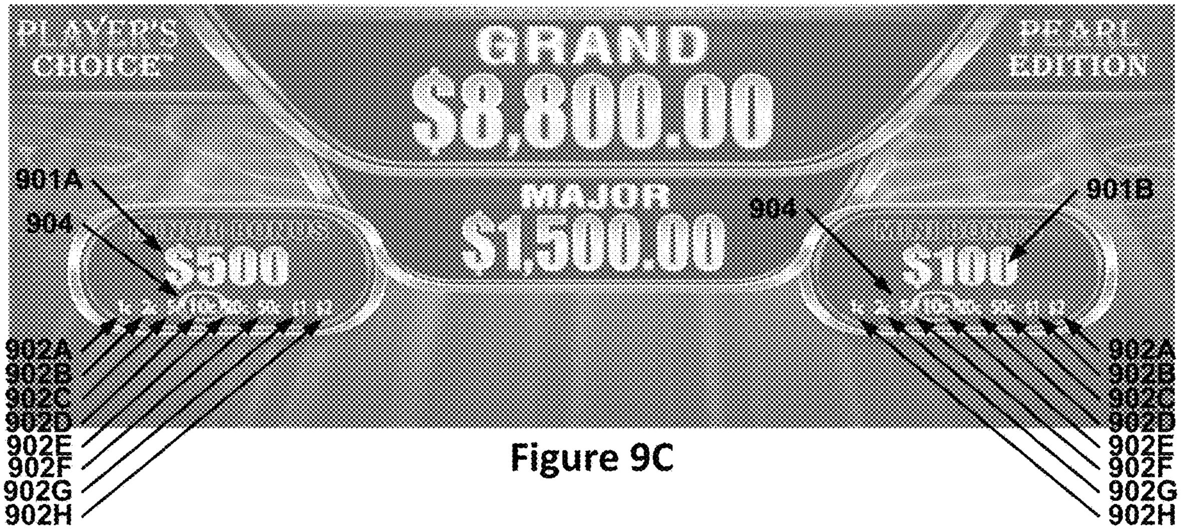
Figure 9D:
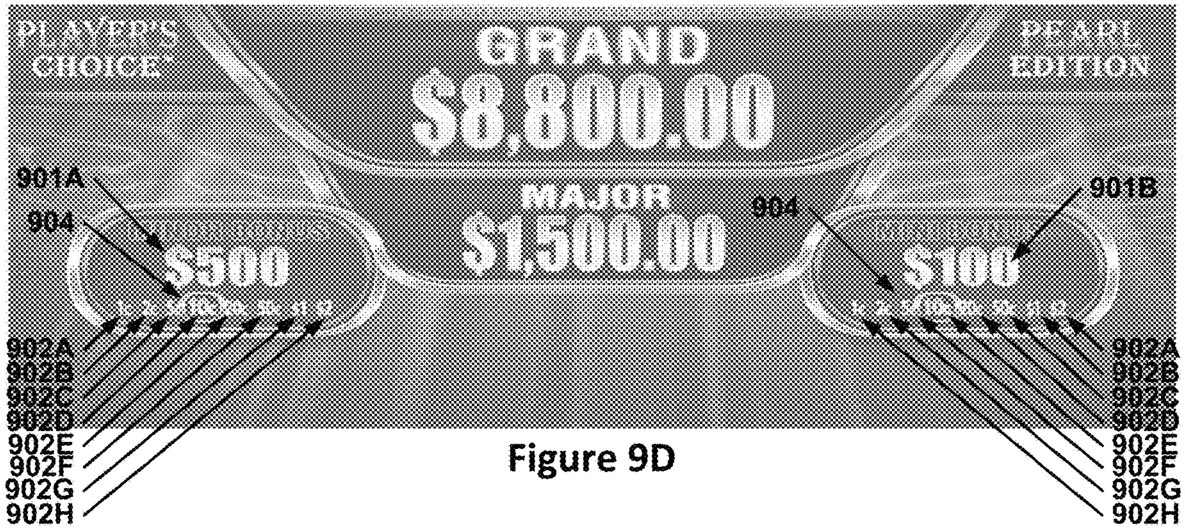
Figure 9E:
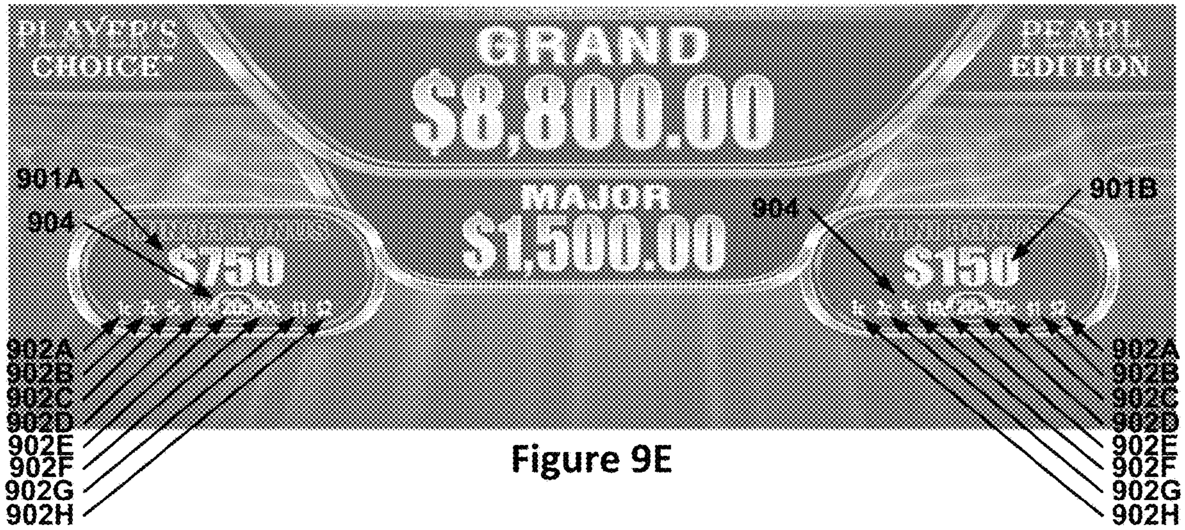
Figure 10A:
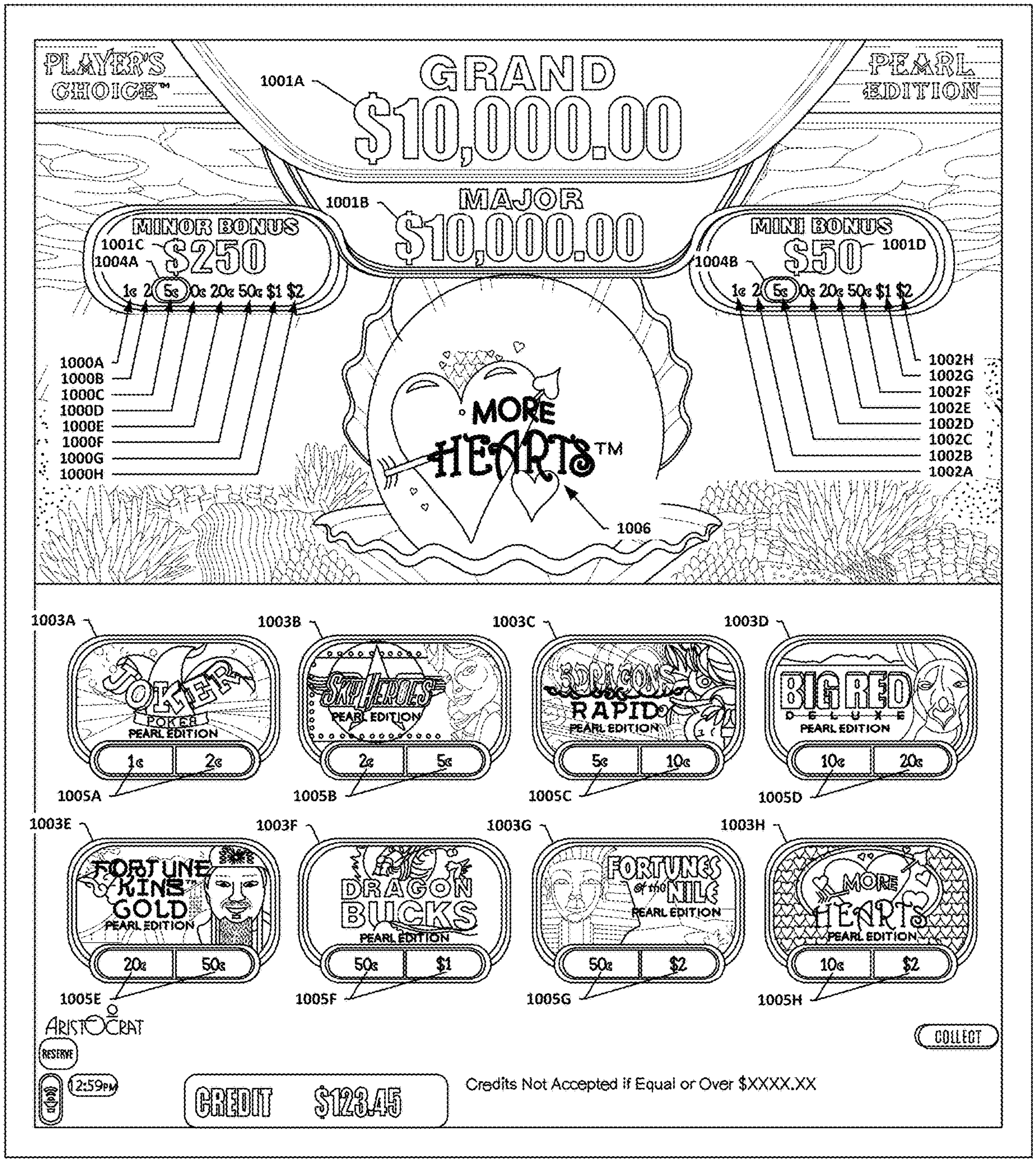
FIGS. 10A through 10E depict a sequence of images from an example attract mode.
Figure 10B:
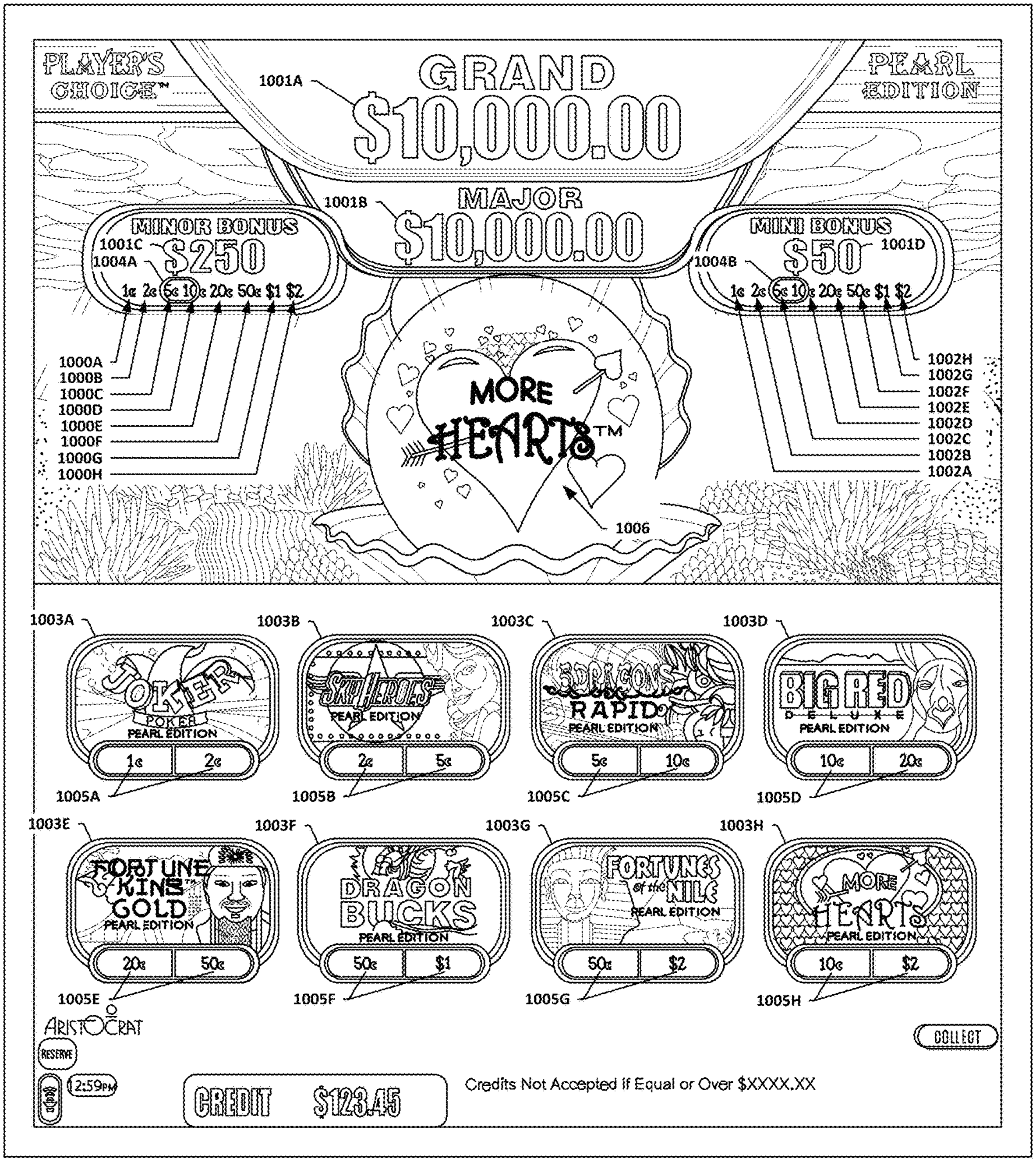
Figure 10C:
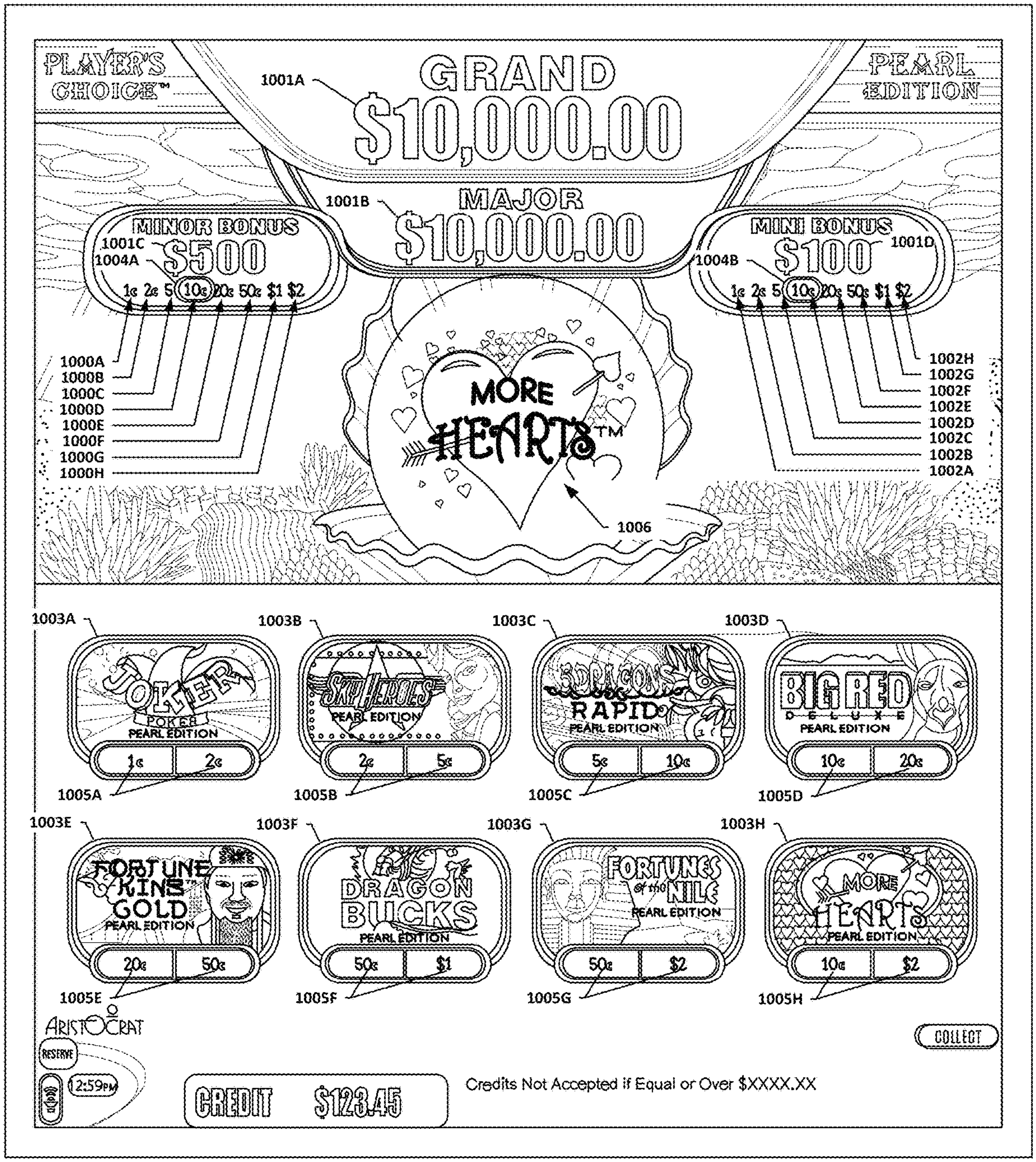
Figure 10D:
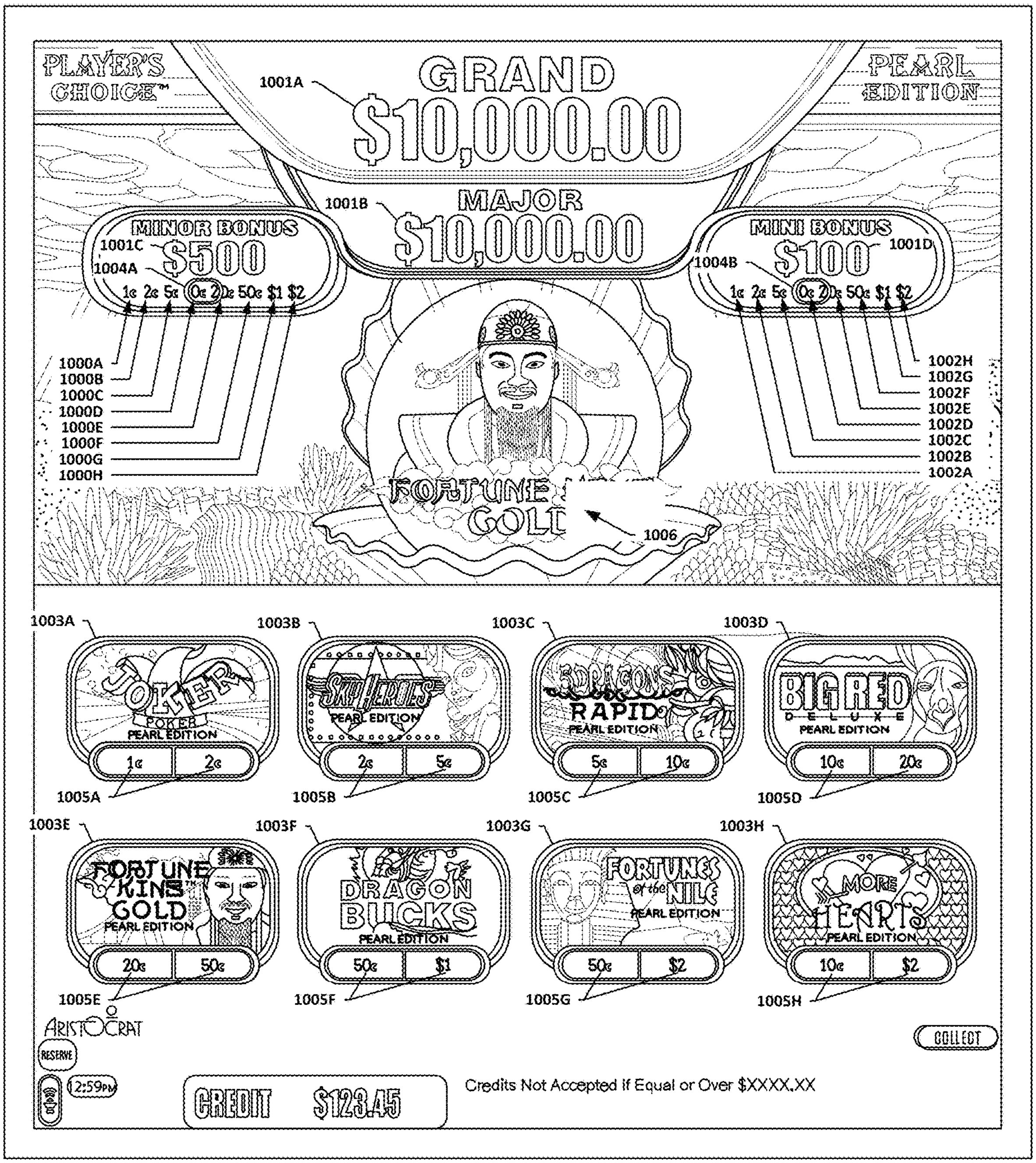
Figure 10E:
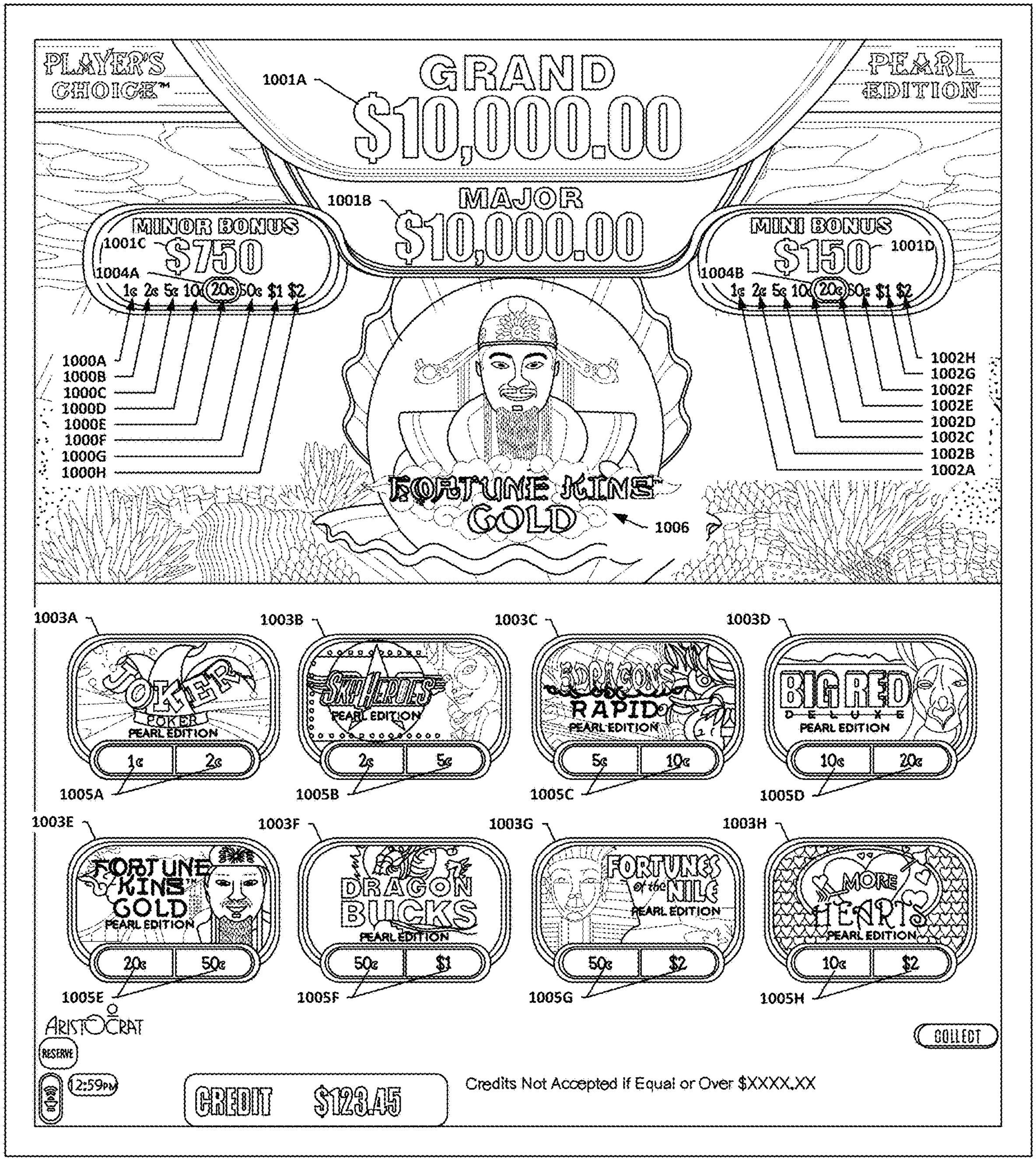

FIGS. 9A-9E show an alternative screen layout to that shown in FIGS. 7A-7C. As can be seen, in this implementation, the highlight marker 904, e.g., slider, moves across denomination markers 902A-H according to the order of the figures (i.e. 9A→9B→9C→9D→9E). FIGS. 9A-9C show a transition where the bonus prize amounts of bonus markers 901A and 901B scale linearly with denomination increase (e.g., the denomination doubles, from 5 c to 10 c, and the relevant bonus prizes double, from $50 to $100 and $250 to $500). FIGS. 9D-9E show a transition where the bonus prize amounts of bonus markers 901A and 901B do not scale linearly with denomination increase (e.g. the denomination doubles, from 10 c to 20 c, while the relevant bonus prize amounts do not double, instead going from $100 to $150 and $500 to $750). Generally, depending on the implementation, each transition may comprise linear scaling of bonus prize amounts, non-linear scaling of bonus prize amounts, or the transitions may comprise both linear and non-linear transitions of bonus prize amounts.

In an implementation, game markers 503A-503H are configured to display a visual indication of the different games available for play on the gaming device 200. Each game marker 503A-503H corresponds to a game available for play. Each game marker 503A-503H comprises a game icon 505A-505H and the playable denominations 506 associated with that game. The game icon 505A-505H comprises any graphic (including text) which is suitable to enable a player to identify the corresponding game available for play. The playable denominations 506 for each game marker 503A-503H indicate the different denominations available for play for the corresponding game. Generally, each denomination option graphic 506 includes at least one denomination and may, for example, include a plurality of different denominations.

In an implementation, the player is enabled to select a game for playing by touching the primary display 240 in the region of the game marker 503A-503H. The gaming device 200 can then display a configuration screen enabling the player to select a denomination in which to play the selected game.

In an implementation, the game animation region 505 is configured to show an available games animation, such as a sequence of images relating to the playable games. For example, the available games animation may transition between images associated with each game (and therefore, each game marker 503A-503H). The transition can include known transition effects, such as fading. In an implementation, the transition may be consistent from game marker 503A to 503H (although, the arrangement of game markers 503A-503H can vary). In another implementation, the transition sequence is random such that the next image is associated with a randomly selected game. In an implementation, a predetermined time elapses between transitions, and that predetermined time may be different to the predetermined time between transitions of the highlight marker 504.

Figure 8:
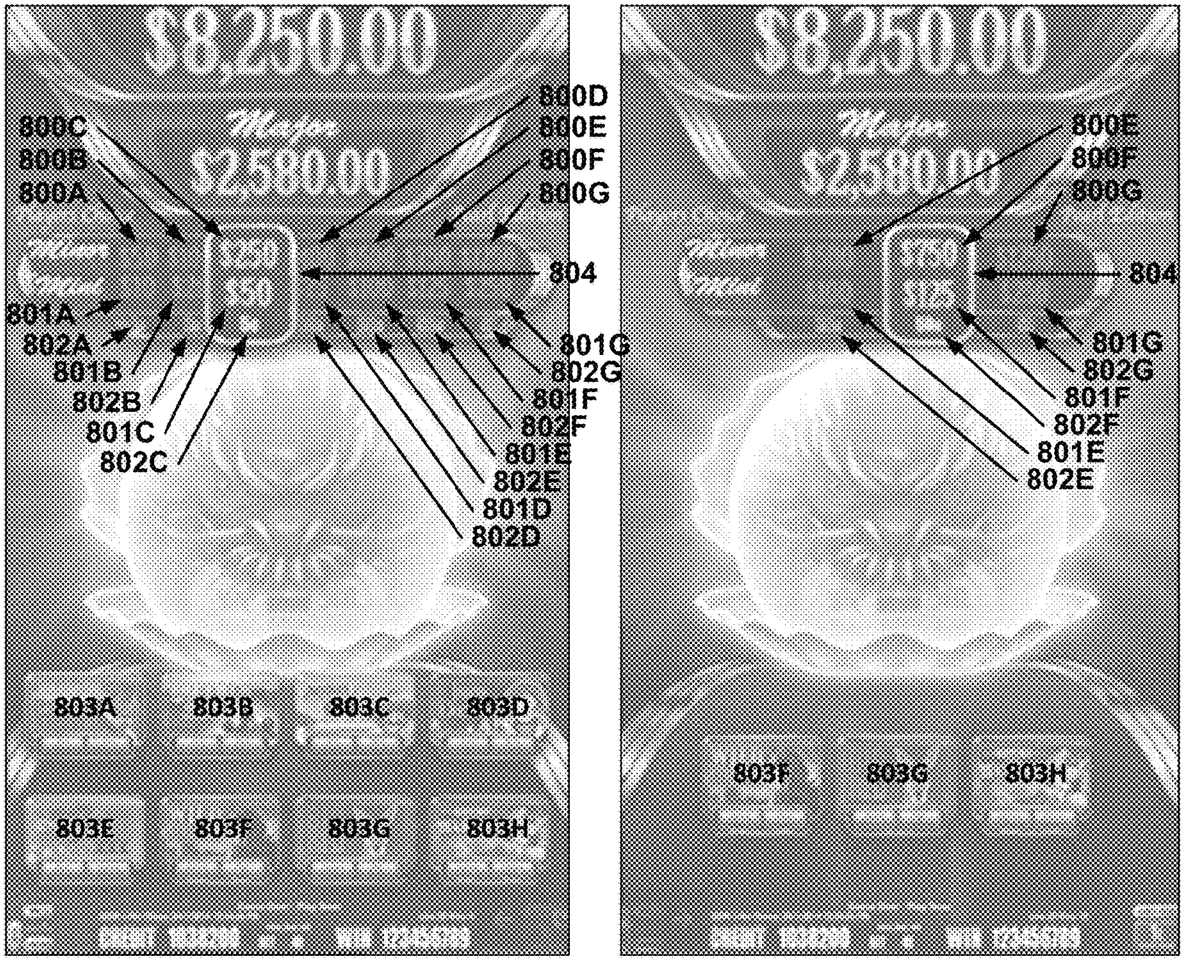
FIG. 8 shows an implementation having a moving highlight marker and bonuses displayed for each denomination at all times.

FIG. 8 shows two implementations wherein one or more (in the example, first and second) bonus markers 800A-800G, 801A-801G are displayed on the display 240 for each denomination marker 802A-802G concurrently. Highlight marker 804 is configured to highlight both a specific denomination marker 802A-802G and its associated first and second bonus markers 800A-800G, 801A-801G. For example, in the figure, denomination marker 802A is associated with first bonus marker 800A and second bonus marker 801A, and all three will be highlighted when denomination marker 802A is highlighted. This implementation is an alternative to changing the bonus prize displayed in bonus markers 501A-501D (which are commonly used for each denomination marker 502A-502H). In the implementation on the left, game markers 803A through 803H for eight different wagering games are shown, each with two denominations associated therewith; in the implementation on the right, game markers 803F through 803H for only three different wagering games are shown; as can be seen, the attract mode may be customized for a variety of different numbers of games.

In some implementations, a transition of the highlight marker is accompanied with a change in the set of displayed game markers. The change may be effected by displaying a corresponding transition from a first set of displayed game markers to a second set of displayed game markers. The change in the set of displayed game markers indicates a change in availability of associated games for play. For example, in FIG. 5, game markers 503A, 503C and 503E are each associated with at least a 1 c denomination, whereas none of game markers 503B, 503D, 503F, 503G and 503H is associated with a 1 c denomination. Similarly, game markers 503A and 503E are each associated with at least a 2 c denomination, whereas none of game markers 503B, 503C, 503D, 503F, 503G and 503H is associated with a 2 c denomination. In this example, a transition of the highlight marker 504 from the 1 c denomination marker 502A to the 2 c denomination marker 502B may be accompanied by display a change from a first set of game markers (503A, 503C and 503E) to a second set of game markers (503A and 503E).

FIGS. 10A through 10E depict a sequence of images from an example attract mode. In FIGS. 10A through 10E, the attract interface includes bonus markers 1001A (grand bonus), 1001B (major bonus), 1001C (minor bonus), and 1001D (mini bonus); bonus markers 1001C and 1001D are each associated, respectively, with a different highlight marker 1004A and 1004B which are each, in turn, respectively associated with a plurality of denomination markers 1000A through 1000H and 1002A through 1000H. During the attract mode, the highlight markers 1004A and 1004B may traverse along the denomination markers 1000A through 1000H and 1002A through 1002H; FIGS. 10A through 10E depict such highlight marker traversal from denomination markers 1000C/1002C to denomination markers 1000E/1002E; the traversal of the highlight markers 1004A/B between other denomination markers 1000/1002 may be similar in nature.

The attract display of FIGS. 10A through 10E also includes a set of game markers 1003A through 1003H, each of which is associated with two different game denomination markers 1005A through 1005H, respectively (in some implementations, game markers 1005A through 1005H may be associated with other numbers of game denomination markers, e.g., one game denomination marker or more than two game denomination markers.

The attract display of FIGS. 10A through 10E may also include a game highlight marker 1006, which may be used to display a graphic or animation related to one of the wagering games associated with a game marker 1003A through 1003H having a respective game denomination marker 1005A through 1005H that matches the currently highlighted denomination marker 1000 and 1002. The graphic or animation, for example, may include a logo, character portrait or animation, symbols, or other content that is related to such a wagering game. In some implementations, if multiple wagering games indicated by the game markers 1003A through 1003H have game denominations that match the currently highlighted denomination marker 1000 and 1002, then the game highlight marker 1006 may be caused to cycle through a graphic or animation that is associated with each of the wagering games that have game denomination markers that match the currently highlighted denomination marker. For example, each denomination marker 1000 and 1002 is associated with two different wagering games represented by the game markers 1003 (except for the 10 c denomination, which is associated with three different wagering games—5 Dragons Rapid, Big Red Deluxe, and More Hearts); the game highlight marker 1006 may thus be caused, in some implementations, to display a graphic or animation related to each of the two or three wagering games associated with each highlighted denomination marker 1000 or 1002. In other implementations, graphics for only a single wagering game may be displayed for each highlighted denomination marker 1000 or 1002, even if multiple game markers 1003 for wagering games are provided that have game denomination markers 1005 that match the highlighted denomination marker 1000 or 1002 (although for each movement/highlighting cycle of the highlight marker 1004, the graphics that are displayed in the game highlight marker 1006 may vary).

In some implementations, the game markers 1003 may be associated with game denominations but no game denomination markers may be provided. Instead, each game marker associated with a particular game denomination may be highlighted in some manner, e.g., by an animation emphasizing that game marker or by showing that game marker in color while greying out other, non-highlighted game markers, when the denomination marker corresponding with that game denomination is highlighted in the attract mode, thereby conveying to the player which wagering game markers correspond with wagering games that are available in the highlighted denomination.

The attract mode displays disclosed herein may provide a number of benefits, including, for example, providing players with a way to easily determine which bonus or bonuses are associated with each of a plurality of different wagering games without having to load or initiate each game, view the associated bonus(es), and then exit the game in order to load or initiate the next game. Another benefit that the attract mode displays discussed herein may provide is to allow players to easily see which wagering games at a particular denomination are available for play on a given electronic gaming machine, thereby allowing players to rapidly determine if they wish to engage in play on the electronic gaming machine. For example, a player may want to view the current value of the prizes for one or more games at the various denominations offered for those games prior to selecting a particular game and denomination combination to play. Absent an attract mode display such as those discussed herein, a player may need to start playing, or at least select, a particular game and denomination combination in order to see what the bonus values are for that particular game and denomination combinations. The player may need to select or play a number of such game/denomination combinations before finding a game/denomination combination that the player finds desirable to wager on.

It will be understood that the various techniques or operations discussed herein are not intended to suggest a particular order of operations unless an order of operations is inherent in the various stages of the techniques or operations discussed. For example, if a technique includes a first operation that produces a result that is required for a second operation to be performed, then the first operation would necessarily need to be performed prior to the second operation. However, if the first operation is merely shown earlier in a process diagram than the second operation, but there is no actual dependency between the first operation and the second operation, then it will be understood that, generally speaking, the first operation and the second operation may be performed in any order. Similarly, ordinal indicators, e.g., (a), (b), (c), etc., and arrows shown in the Figures used herein are used, unless otherwise indicated (either explicitly or inherently), to facilitate organization and for clarity; they are not intended to, and should not be understood to, necessarily convey a particular order or sequence of events. It will also be understood that the various operations discussed herein may be performed in manners other than as discussed. For example, various operations, in some implementations, may be combined into a lesser number of distinct operations or may be split apart into a greater number of operations; all such permutations are considered within the scope of this disclosure.

In this disclosure, the term "corresponding" or the phrase "corresponds with" is used, in some instances, to refer to items that have a relationship with one another.

It is to be understood that the phrases "for each <item> of the one or more <items>," "each <item> of the one or more <items>," or the like, if used herein, should be understood to be inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A computer-readable, non-transitory medium storing one or more computer-executable instructions for controlling one or more processors of an electronic gaming machine having one or more display devices, wherein the computer-executable instructions stored on the computer-readable, non-transitory medium are configured to, when executed by the one or more processors, control the one or more processors to cause the one or more processors to:

a) control the one or more display devices to display an attract mode display that includes one or more bonus markers and a plurality of denomination markers, each denomination marker displaying a corresponding denomination of the plurality of denominations supported by the electronic gaming machine;

b) control the one or more display devices to highlight one of the denomination markers;

c) determine, for each bonus marker, a bonus prize associated with that bonus marker and the highlighted denomination marker and control the one or more display devices to display that bonus prize in a region of the one or more display devices associated with that bonus marker;

d) control the one or more display devices to display a denomination transition in which the currently highlighted denomination marker reverts to a non-highlighted representation and a next denomination marker is highlighted; and e) control the one or more display devices to display a bonus transition in which the bonus prize displayed in association with at least one bonus marker changes to a bonus prize associated with both that bonus marker and the next denomination marker.

2. The computer-readable, non-transitory medium of claim 1, wherein the computer-readable, non-transitory medium further stores additional computer-executable instructions configured to, when executed by the one or more processors, control the one or more processors to cause the attract mode display to further include a highlight marker and to cause each highlighted denomination marker to be highlighted by modifying the display of that denomination marker with the highlight marker.

3. The computer-readable, non-transitory medium of claim 1, wherein the computer-readable, non-transitory medium further stores additional computer-executable instructions configured to, when executed by the one or more processors, control the one or more processors to cause a plurality of game markers to be displayed on the one or more display devices, each game marker associated with a different wagering game, wherein each wagering game is associated with one or more game denominations and each game denomination corresponds with one of the denomination markers.

4. The computer-readable, non-transitory medium of claim 3, wherein the computer-readable, non-transitory medium further stores additional computer-executable instructions configured to, when executed by the one or more processors, control the one or more processors to cause, in association with the highlighting of any denomination marker, the game marker or game markers associated with the wagering game or wagering games associated with the game denomination associated with the highlighted denomination marker to be emphasized as compared with the game marker or game markers associated with the wagering game or wagering games not associated with the game denomination associated with the highlighted denomination marker.

5. The computer-readable, non-transitory medium of claim 1, wherein the computer-readable, non-transitory medium further stores additional computer-executable instructions configured to, when executed by the one or more processors, control the one or more processors to cause, in association with the highlighting of any denomination marker and by the one or more processors, a corresponding game marker for each wagering game associated with a game denomination associated with the highlighted denomination marker to be displayed on the one or more display devices of the electronic gaming machine.

6. The computer-readable, non-transitory medium of claim 1, wherein each denomination is associated with one or more wagering games in a plurality of wagering games and the computer-readable, non-transitory medium further stores additional computer-executable instructions configured to, when executed by the one or more processors, control the one or more processors to cause, in association with the highlighting of any denomination marker associated with a denomination associated with only one wagering game, a game highlight marker to indicate the wagering game associated with the denomination associated with the highlighted denomination marker.

7. The computer-readable, non-transitory medium of claim 6, wherein the computer-readable, non-transitory medium further stores additional computer-executable instructions configured to, when executed by the one or more processors, control the one or more processors to cause, in association with the highlighting of any denomination marker associated with a denomination associated with multiple wagering games, the game highlight marker to sequentially indicate the wagering games associated with the denomination associated with the highlighted denomination marker.

8. A method for operating a gaming device, comprising the steps of:

a) causing, by one or more processors of the gaming device, an attract mode display to be displayed on one or more displays of the gaming device, the attract mode display including one or more bonus markers and a plurality of denomination markers, each denomination marker displaying a corresponding denomination of the plurality of denominations supported by the game device;

b) controlling, by the one or more processors, the one or more displays to highlight one of the denomination markers;

c) determining, for each bonus marker and by the one or more processors, a bonus prize associated with that bonus marker and the highlighted denomination marker and causing, by the one or more processors, information regarding that bonus prize to be displayed in a region of the one or more displays associated with that bonus marker;

d) controlling, by the one or more processors, the one or more displays to display a denomination transition in which the currently highlighted denomination marker reverts to a non-highlighted representation and a next denomination marker is highlighted; and e) causing, by the one or more processors, a bonus transition to be displayed in which the bonus prize displayed in association with at least one bonus marker changes to another bonus prize associated with both that bonus marker and the next denomination marker.

9. The method of claim 8, wherein the attract mode display further includes a highlight marker and each highlighted denomination marker is highlighted by modifying that denomination marker with the highlight marker.

10. The method of claim 8, further comprising causing, by the one or more processors, a plurality of game markers to be displayed on the one or more displays, each game marker associated with a different wagering game, wherein each wagering game is associated with one or more game denominations and each game denomination corresponds with one of the denomination markers.

11. The method of claim 10, further comprising causing, in association with the highlighting of any denomination marker and by the one or more processors, the game marker or game markers associated with the wagering game or wagering games associated with the game denomination associated with the highlighted denomination marker to be emphasized as compared with the game marker or game markers associated with the wagering game or wagering games not associated with the game denomination associated with the highlighted denomination marker.

12. The method of claim 8, wherein each game denomination is associated with one or more wagering games in a plurality of wagering games, the method further comprising causing, in association with the highlighting of any denomination marker and by the one or more processors, a corresponding game marker for each wagering game associated with the game denomination associated with the highlighted denomination marker to be displayed on the one or more displays of the gaming device.

13. The method of claim 8, wherein each game denomination is associated with one or more wagering games in a plurality of wagering games and the method further comprises causing, in association with the highlighting of any denomination marker associated with a game denomination associated with only one wagering game and by the one or more processors, a game highlight marker to indicate the wagering game associated with the game denomination associated with the highlighted denomination marker.

14. The method of claim 13, further comprising causing, in association with the highlighting of any denomination marker associated with a game denomination associated with multiple wagering games and by the one or more processors, the game highlight marker to sequentially indicate the wagering games associated with the game denomination associated with the highlighted denomination marker.

15. A gaming device comprising:

one or more display devices;

one or more processors; and a memory, wherein:

the memory, the one or more processors, and the one or more display devices are operatively connected, and the memory stores computer-executable instructions which, when executed by the one or more processors, cause the one or more processors to:

a) control the one or more display devices to display an attract mode display that includes one or more bonus markers and a plurality of denomination markers, each denomination marker displaying a corresponding denomination of the plurality of denominations supported by the gaming device;

b) control the one or more display devices to highlight one of the denomination markers;

c) determine, for each bonus marker, a bonus prize associated with that bonus marker and the highlighted denomination marker and control the one or more display devices to display that bonus prize in a region of the one or more display devices associated with that bonus marker;

d) control the one or more display devices to display a denomination transition in which the currently highlighted denomination marker reverts to a non-highlighted representation and a next denomination marker is highlighted; and e) control the one or more display devices to display a bonus transition in which the bonus prize displayed in association with at least one bonus marker changes to a bonus prize associated with both that bonus marker and the next denomination marker.

16. The gaming device of claim 15, wherein the memory further stores additional computer-executable instructions which, when executed by the one or more processors, cause the one or more processors to cause a plurality of game markers to be displayed on the one or more display devices, each game marker associated with a different wagering game, wherein each wagering game is associated with one or more game denominations and each game denomination corresponds with one of the denomination markers.

17. The gaming device of claim 16, wherein the memory further stores additional computer-executable instructions which, when executed by the one or more processors, cause the one or more processors to cause, in association with the highlighting of any denomination marker, the game marker or game markers associated with the wagering game or wagering games associated with the game denomination associated with the highlighted denomination marker to be emphasized as compared with the game marker or game markers associated with the wagering game or wagering games not associated with the game denomination associated with the highlighted denomination marker.

18. The gaming device of claim 15, wherein the memory further stores additional computer-executable instructions which, when executed by the one or more processors, cause the one or more processors to cause, in association with the highlighting of any denomination marker and by the one or more processors, a corresponding game marker for each wagering game associated with the game denomination associated with the highlighted denomination marker to be displayed on the one or more display devices of the gaming device.

19. The gaming device of claim 15, wherein each game denomination is associated with one or more wagering games in a plurality of wagering games and the memory further stores additional computer-executable instructions which, when executed by the one or more processors, cause the one or more processors to cause, in association with the highlighting of any denomination marker associated with a game denomination associated with only one wagering game, a game highlight marker to indicate the wagering game associated with the game denomination associated with the highlighted denomination marker.

20. The gaming device of claim 19, wherein the memory further stores additional computer-executable instructions which, when executed by the one or more processors, cause the one or more processors to cause, in association with the highlighting of any denomination marker associated with a game denomination associated with multiple wagering games, the game highlight marker to sequentially indicate the wagering games associated with the game denomination associated with the highlighted denomination marker.

* * * * *